(12) United States Patent
Xu

(10) Patent No.: US 11,550,123 B2
(45) Date of Patent: Jan. 10, 2023

(54) OPTICAL IMAGING LENS ASSEMBLY INCLUDING SIX LENSES OF +---+- OR +-+-+- REFRACTIVE POWERS

(71) Applicant: ZHEJIANG SUNNY OPTICAL CO., LTD., Ningbo (CN)

(72) Inventor: Biao Xu, Ningbo (CN)

(73) Assignee: ZHEJIANG SUNNY OPTICAL CO., LTD., Ningbo (CN)

( * ) Notice: Subject to any disclaimer, the term of this patent is extended or adjusted under 35 U.S.C. 154(b) by 330 days.

(21) Appl. No.: 16/744,887

(22) Filed: Jan. 16, 2020

(65) Prior Publication Data

US 2020/0150384 A1 May 14, 2020

Related U.S. Application Data

(63) Continuation of application No. PCT/CN2018/106614, filed on Sep. 20, 2018.

(30) Foreign Application Priority Data

Mar. 7, 2018 (CN) .......................... 201810187128.1

(51) Int. Cl.
  *G02B 13/00* (2006.01)
  *G02B 9/62* (2006.01)
(52) U.S. Cl.
  CPC ........... *G02B 9/62* (2013.01); *G02B 13/0045* (2013.01)
(58) Field of Classification Search
  CPC .............................. G02B 9/62; G02B 13/0045
  See application file for complete search history.

(56) References Cited

U.S. PATENT DOCUMENTS

2014/0185141 A1  7/2014 Lee et al.
2014/0354872 A1* 12/2014 Chen .................. G02B 13/0045
                                                   359/713

(Continued)

FOREIGN PATENT DOCUMENTS

CN       201955535 U   8/2011
CN       202256844 U   5/2012
                (Continued)

OTHER PUBLICATIONS

International Search Report from corresponding International Application No. PCT/CN2018/106614, dated Dec. 25, 2018, pp. 1-4, State Intellectual Property Office of the P.R. China, Beijing, China.

(Continued)

*Primary Examiner* — Wen Huang
(74) *Attorney, Agent, or Firm* — Hauptman Ham, LLP

(57) ABSTRACT

The present disclosure discloses an optical imaging lens assembly including, sequentially from an object side to an image side along an optical axis, a first lens, a second lens, a third lens, a fourth lens, a fifth lens and a sixth lens. The first lens has a positive refractive power, and an object-side surface thereof is a convex surface and an image-side surface thereof is a concave surface; the second lens has a negative refractive power, and an image-side surface thereof is a concave surface; the third lens has a positive refractive power or a negative refractive power; the fourth lens has a negative refractive power; the fifth lens has a positive refractive power, and an image-side surface thereof is a convex surface; the sixth lens has a negative refractive power, and both of an object-side surface and an image-side surface thereof are concave surfaces.

17 Claims, 12 Drawing Sheets

(56) References Cited

U.S. PATENT DOCUMENTS

| | | | |
|---|---|---|---|
| 2015/0138425 A1 | 5/2015 | Lee et al. | |
| 2017/0090156 A1 | 3/2017 | Hsu et al. | |
| 2017/0371134 A1 | 12/2017 | Huang | |
| 2018/0120540 A1* | 5/2018 | Teraoka | G02B 13/0045 |

FOREIGN PATENT DOCUMENTS

| | | | |
|---|---|---|---|
| CN | 102621667 A | | 8/2012 |
| CN | 202522758 U | | 11/2012 |
| CN | 102854606 A | | 1/2013 |
| CN | 103955047 A | | 7/2014 |
| CN | 104216095 A | | 12/2014 |
| CN | 104423017 A | | 3/2015 |
| CN | 104570284 A | | 4/2015 |
| CN | 105319687 A | | 2/2016 |
| CN | 105511063 A | | 4/2016 |
| CN | 105607229 | | 5/2016 |
| CN | 105607229 A | * | 5/2016 |
| CN | 105842823 A | | 8/2016 |
| CN | 106168697 A | | 11/2016 |
| CN | 106483637 A | | 3/2017 |
| CN | 106526795 | | 3/2017 |
| CN | 106556919 A | | 4/2017 |
| CN | 106646833 A | | 5/2017 |
| CN | 107065135 A | | 8/2017 |
| CN | 107065136 A | | 8/2017 |
| CN | 107167900 A | | 9/2017 |
| CN | 107219613 A | | 9/2017 |
| CN | 107272161 | | 10/2017 |
| CN | 107436477 A | | 12/2017 |
| CN | 109709662 A | | 5/2019 |
| CN | 109946821 A | | 6/2019 |
| JP | 2011085733 A | | 4/2011 |
| TW | 201800794 A | | 1/2018 |

OTHER PUBLICATIONS

Chinese Evaluation Report of Utility Model Patent in corresponding Chinese Application No. 2018203100217, dated Sep. 3, 2021; 9 pgs.
Office Action in corresponding Chinese Application No. 201811346355.0, dated Jul. 30, 2020; 5 pgs.
Office Action in corresponding Chinese Application No. 201910400948.9, dated Oct. 29, 2020; 16 pgs.
Office Action in corresponding Chinese Application No. 201910400949.3, dated Oct. 29, 2020; 13 pgs.
Office Action in corresponding Chinese Application No. 201910172541.5, dated Sep. 18, 2020; 20 pgs.
International Search Report in corresponding International Application No. PCT/CN2018/106614, dated Dec. 25, 2018; 5 pgs.
Search Report in a corresponding Chinese Application dated Jan. 31, 2018; 5 pgs.

* cited by examiner

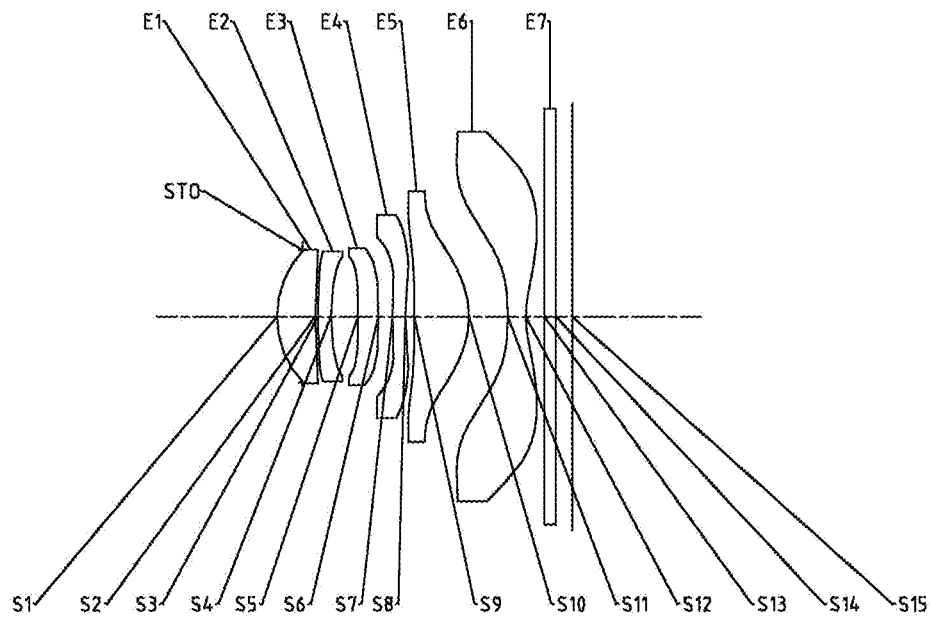
Fig. 5
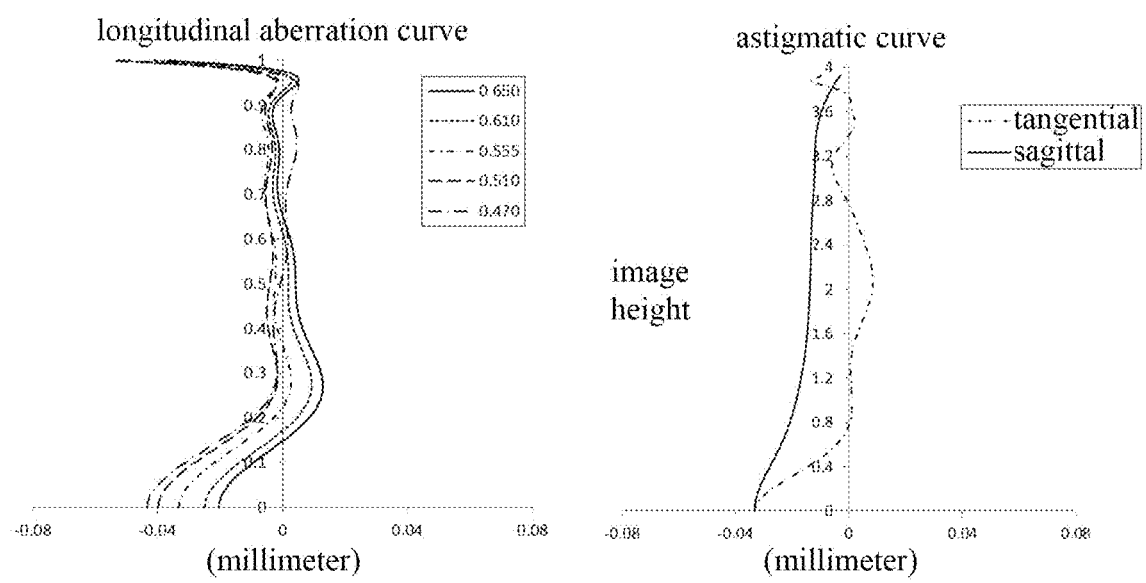
Fig. 6A
Fig. 6B

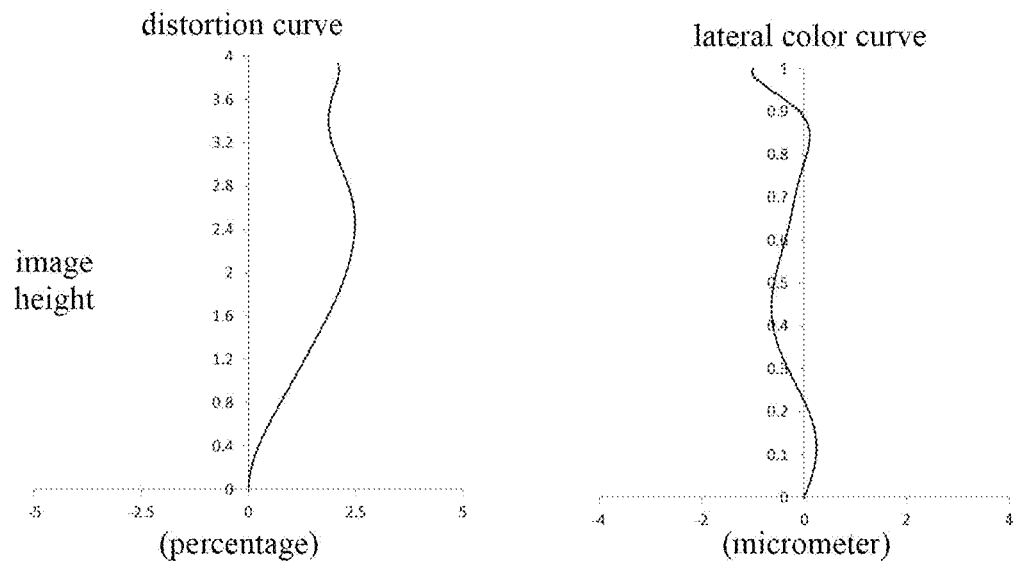
Fig. 10C
Fig. 10D
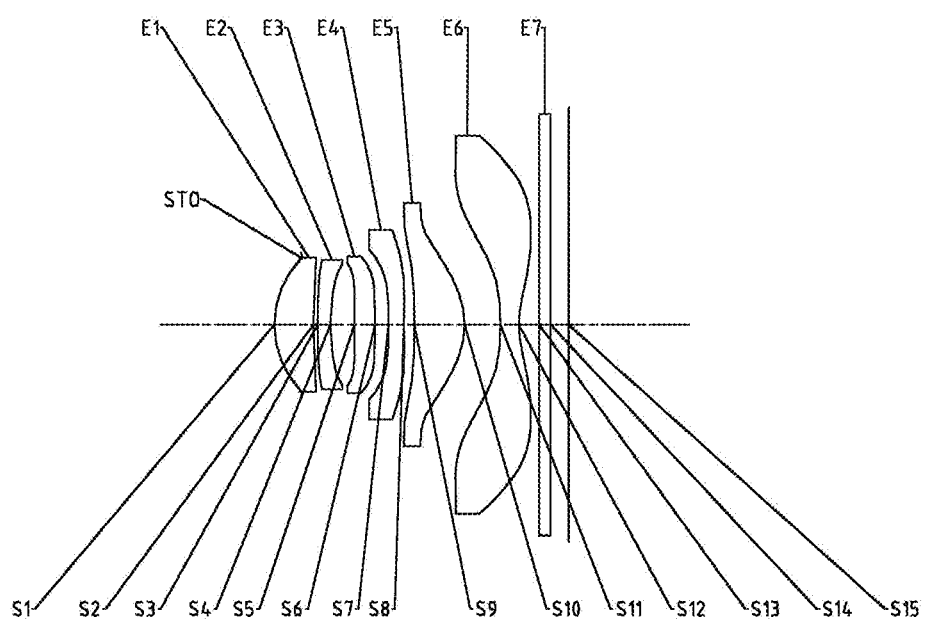
Fig. 11

OPTICAL IMAGING LENS ASSEMBLY INCLUDING SIX LENSES OF +---+- OR +-+-+- REFRACTIVE POWERS

CROSS-REFERENCE TO RELATED APPLICATION

The present patent application is a continuation of International Application No. PCT/CN2018/106614, filed on Sep. 20, 2018, which claims the priority from Chinese Patent Application No. 201810187128.1, filed with the China National Intellectual Property Administration (CNIPA) on Mar. 7, 2018. Both of the aforementioned patent applications are hereby incorporated by reference in their entireties.

TECHNICAL FIELD

The present disclosure relates to an optical imaging lens assembly, and more specifically to an optical imaging lens assembly including six lenses.

BACKGROUND

With the development of science and technology, the electronic products with imaging function are developed rapidly, and the requirement of imaging lens assembly suitable for portable electronic products is gradually improved. At the same time, with the advancement of image sensors such as Charge Coupled Device (CCD) or Complementary Metal-Oxide Semiconductor (CMOS), the number of pixels on the chip is increased while the size of the single pixel is reduced, and thus high imaging performance of the corresponding imaging lens assembly is required.

Therefore, there is a need for an optical imaging lens assembly having characteristics such as large image plane, large aperture, ultra-thin, and the like.

SUMMARY

The present disclosure provides an optical imaging lens assembly that is applicable to portable electronic products and at least solves or partially addresses at least one of the above disadvantages of the prior art.

In one aspect, the present disclosure provides an optical imaging lens assembly including, sequentially from an object side to an image side along an optical axis, a first lens, a second lens, a third lens, a fourth lens, a fifth lens and a sixth lens. The first lens may have a positive refractive power, and an object-side surface thereof may be a convex surface and an image-side surface thereof may be a concave surface; the second lens may have a negative refractive power, and an image-side surface thereof may be a concave surface; the third lens has a positive refractive power or a negative refractive power; the fourth lens may have a negative refractive power; the fifth lens may have a positive refractive power, and an image-side surface thereof may be a convex surface; the sixth lens may have a negative refractive power, and both of an object-side surface and an image-side surface thereof may be concave surfaces. Here, an effective focal length f5 of the fifth lens and a center thickness CT2 of the second lens on the optical axis may satisfy: $11.5 \leq f5/CT2 \leq 12.5$.

In one implementation, a total effective focal length f of the optical imaging lens assembly and half of a maximal field-of-view HFOV of the optical imaging lens assembly may satisfy: $3.8 \leq f \times \tan(HFOV) < 5.0$.

In one implementation, a total effective focal length f of the optical imaging lens assembly and an entrance pupil diameter EPD of the optical imaging lens assembly may satisfy: $f/EPD \leq 1.8$.

In one implementation, a distance TTL on the optical axis from a center of the object-side surface of the first lens to an image plane of the optical imaging lens assembly and half of a diagonal length ImgH of an effective pixel area on the image plane of the optical imaging lens assembly may satisfy: $TTL/ImgH \leq 1.4$.

In one implementation, an effective focal length f2 of the second lens and a total effective focal length f of the optical imaging lens assembly may satisfy: $-3.0 < f2/f < -2.0$.

In one implementation, a total effective focal length f of the optical imaging lens assembly and the effective focal length f5 of the fifth lens may satisfy: $1.1 < f/f5 < 1.6$.

In one implementation, an effective focal length f1 of the first lens and an effective focal length f6 of the sixth lens may satisfy: $-1.7 < f1/f6 < -1.2$.

In one implementation, a radius of curvature R11 of the object-side surface of the sixth lens and a radius of curvature R12 of the image-side surface of the sixth lens may satisfy: $1.5 < (R11-R12)/(R11+R12) < 2.0$.

In one implementation, a radius of curvature R2 of the image-side surface of the first lens and a radius of curvature R1 of the object-side surface of the first lens may satisfy: $4.0 < R2/R1 < 5.0$.

In one implementation, a spaced distance T56 on the optical axis between the fifth lens and the sixth lens and a spaced distance T23 on the optical axis between the second lens and the third lens may satisfy: $1.0 \leq T56/T23 \leq 2.0$.

In one implementation, an effective focal length f2 of the second lens and a radius of curvature R4 of the image-side surface of the second lens may satisfy: $-3.0 \leq f2/R4 \leq -1.5$.

In one implementation, a center thickness CT1 of the first lens on the optical axis and the center thickness CT2 of the second lens on the optical axis may satisfy: $2.2 < CT1/CT2 < 3.2$.

In another aspect, the present disclosure provides an optical imaging lens assembly including, sequentially from an object side to an image side along an optical axis, a first lens, a second lens, a third lens, a fourth lens, a fifth lens and a sixth lens. The first lens may have a positive refractive power, and an object-side surface thereof may be a convex surface and an image-side surface thereof may be a concave surface; the second lens may have a negative refractive power, and an image-side surface thereof may be a concave surface; the third lens has a positive refractive power or a negative refractive power; the fourth lens may have a negative refractive power; the fifth lens may have a positive refractive power, and an image-side surface thereof may be a convex surface; the sixth lens may have a negative refractive power, and both of an object-side surface and an image-side surface thereof may be concave surfaces. Here, a radius of curvature R11 of the object-side surface of the sixth lens and a radius of curvature R12 of the image-side surface of the sixth lens may satisfy: $1.5 < (R11-R12)/(R11+R12) < 2.0$.

The present disclosure employs a plurality of (for example, six) lenses, and the optical imaging lens assembly has at least one advantageous effect such as ultra-thin, miniaturization, large image plane, large aperture, high image quality and the like by properly assigning the refractive power, the surface shape, the center thickness of each lens, and the spaced distance on the optical axis between the lenses.

BRIEF DESCRIPTION OF THE DRAWINGS

Other features, purpose and advantages of the present disclosure will become apparent through detailed description of the non-limiting implementations given in conjunction with the accompanying drawings. In the drawings:

FIG. 5 is a schematic structural view of an optical imaging lens assembly according to embodiment 3 of the present disclosure;

FIGS. 6A to 6D illustrate a longitudinal aberration curve, an astigmatism curve, a distortion curve and a lateral color curve of the optical imaging lens assembly according to embodiment 3, respectively;

FIGS. 10A to 10D illustrate a longitudinal aberration curve, an astigmatism curve, a distortion curve and a lateral color curve of the optical imaging lens assembly according to embodiment 5, respectively;

FIG. 11 is a schematic structural view of an optical imaging lens assembly according to embodiment 6 of the present disclosure;

DETAILED DESCRIPTION OF EMBODIMENTS

Figure 1:
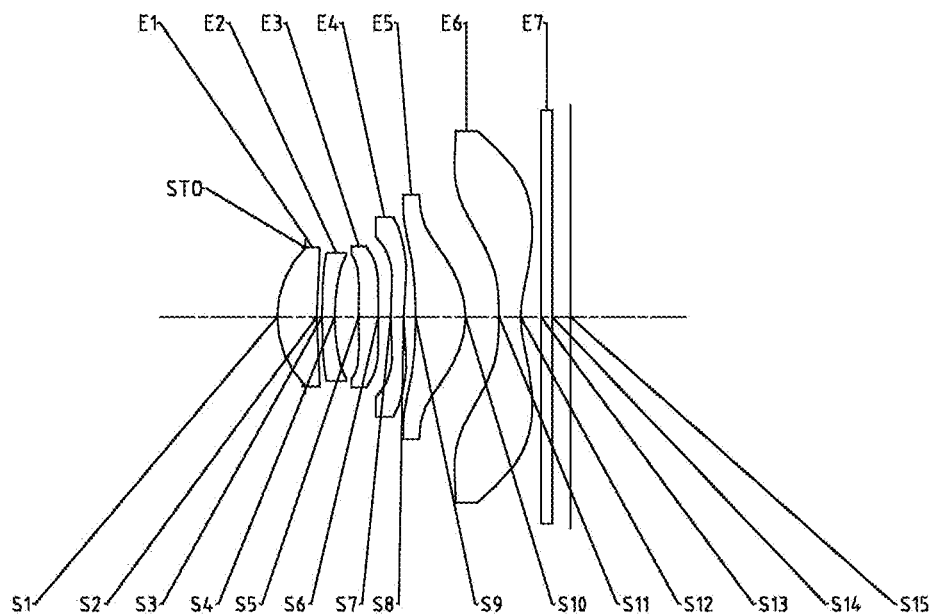
FIG. 1 is a schematic structural view of an optical imaging lens assembly according to embodiment 1 of the present disclosure.

For a better understanding of the present disclosure, various aspects of the present disclosure will be described in more detail with reference to the drawings. It should be understood that, these detailed descriptions are merely used for describing exemplary embodiments of the present disclosure, but not in any way for limiting the scope of the present disclosure. Throughout the specification, the same reference numerals designate the same elements. The expression "and/or" includes any and all combinations of one or more of the associated listed items.

It should be noted that, in the present specification, the expressions such as first, second and third are merely for distinguishing one feature from another feature without indicating any limitation on the features. Thus, a first lens discussed below could be referred to as a second lens or a third lens without departing from the teachings of the present disclosure.

In the accompanying drawings, for convenience of the description, thicknesses, sizes and shapes of lenses have been slightly exaggerated. Specifically, spherical or aspheric shapes shown in the accompanying drawings are shown by way of examples. That is, spherical or aspheric shapes are not limited to the spherical or aspheric shapes shown in the accompanying drawings. The accompanying drawings are merely examples, not strictly drawn to scale.

Herein, a paraxial region refers to a region near the optical axis. If a surface of a lens is a convex surface and the position of the convex is not defined, it indicates that the surface of the lens is convex at least in the paraxial region; if a surface of a lens is a concave surface and the position of the concave is not defined, it indicates that the surface of the lens is concave at least in the paraxial region. In each lens, a surface of the lens closest to the object side is referred to as an object-side surface, and a surface of the lens closest to the image plane is referred to as an image-side surface.

It should be further understood that the terms "comprising," "including," "having", "containing" and/or "contain", when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may", when describing implementations of the present disclosure, refers to "one or more implementations of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the embodiments in the present disclosure and the features in the embodiments may be combined with each other on a non-conflict basis. The present disclosure will be described in detail below with reference to the accompanying drawings and in combination with the embodiments.

The features, principles, and other aspects of the present disclosure are described in detail below.

An optical imaging lens assembly according to exemplary implementations of the present disclosure may include, for example, six lenses having refractive power, i.e., a first lens, a second lens, a third lens, a fourth lens, a fifth lens and a sixth lens. These six lenses are sequentially arranged from an object side to an image side along an optical axis.

In an exemplary implementation, the first lens may have a positive refractive power, and an object-side surface thereof may be a convex surface and an image-side surface thereof may be a concave surface; the second lens may have a negative refractive power, and an image-side surface thereof may be a concave surface; the third lens has a positive refractive power or a negative refractive power; the fourth lens may have a negative refractive power; the fifth lens may have a positive refractive power, and an image-side surface thereof may be a convex surface; and the sixth lens may have a negative refractive power, and an object-side surface thereof may be a concave surface and an image-side surface thereof may also be a concave surface.

In an exemplary implementation, an object-side surface of the second lens may be a convex surface.

In an exemplary implementation, an image-side surface of the fourth lens may be a concave surface.

In an exemplary implementation, the optical imaging lens assembly of the present disclosure may satisfy: $3.8 \leq f \times \tan(HFOV) < 5.0$, where f is a total effective focal length of the optical imaging lens assembly, and HFOV is half of a maximal field-of-view of the optical imaging lens assembly. More specifically, f and HFOV may further satisfy: $3.8 \leq f \times \tan(HFOV) < 4.0$, for example, $3.81 \leq f \times \tan(HFOV) \leq 3.94$. By constraining half of the maximal field-of-view of the optical imaging lens assembly and controlling the total effective focal length of the optical imaging lens assembly, the imaging effect with a large image plane for the optical imaging lens assembly may be achieved.

In an exemplary implementation, the optical imaging lens assembly of the present disclosure may satisfy: $11.5 \leq f5/CT2 \leq 12.5$, where f5 is an effective focal length of the fifth lens, and CT2 is a center thickness of the second lens on the optical axis. More specifically, f5 and CT2 may further satisfy: $11.50 \leq f5/CT2 \leq 12.34$. By controlling the ratio of the effective focal length of the fifth lens to the center thickness of the second lens, the processability of the second lens properly is advantageously ensured, and the contribution amount of the spherical aberration of the fifth lens is advantageously reduced.

In an exemplary implementation, the optical imaging lens assembly of the present disclosure may satisfy: $f/EPD \leq 1.8$, where f is a total effective focal length of the optical imaging lens assembly, and EPD is an entrance pupil diameter of the optical imaging lens assembly. More specifically, f and EPD may further satisfy $1.65 \leq f/EPD \leq 1.80$. By properly assigning the refractive power and constraining the entrance pupil diameter of the optical imaging lens assembly, the optical imaging lens assembly with a large image plane has a smaller F-number (i.e., f/EPD), and thereby ensuring that the optical imaging lens assembly has an imaging effect with a large aperture, such that the optical imaging lens assembly has a good imaging quality even in dark environment.

In an exemplary implementation, the optical imaging lens assembly of the present disclosure may satisfy: $-3.0 < f2/f < -2.0$, where f2 is an effective focal length of the second lens, and f is a total effective focal length of the optical imaging lens assembly. More specifically, f2 and f may further satisfy: $-2.9 < f2/f < -2.1$, for example, $-2.79 \leq f2/f \leq -2.13$. By properly controlling the effective focal length of the second lens, a positive spherical aberration may be generated by the second lens. The positive spherical aberration generated by the second lens is used to compensate the negative spherical aberration generated by other lenses in the optical system, so that the optical imaging lens assembly may have a better imaging quality in the on-axis field of view area.

In an exemplary implementation, the optical imaging lens assembly of the present disclosure may satisfy: $1.1 < f/f5 < 1.6$, where f is a total effective focal length of the optical imaging lens assembly, and f5 is an effective length of the fifth lens. More specifically, f and f5 may further satisfy: $1.29 \leq f/f5 \leq 1.51$. By properly controlling the effective focal length of the fifth lens, the contribution amount of refractive power of the fifth lens may be controlled appropriately, and the high-order spherical aberration generated by the imaging lens may be compensated.

In an exemplary implementation, the optical imaging lens assembly of the present disclosure may satisfy: $-1.7 < f1/f6 < -1.2$, where f1 is an effective focal length of the first lens, and f6 is an effective focal length of the sixth lens. More specifically, f1 and f6 may further satisfy: $-1.61 \leq f1/f6 \leq -1.39$. By properly controlling the ratio of the effective focal length of the first lens to the effective focal length of the sixth lens, the refractive power of the system may be appropriately assigned, so that the positive and negative spherical aberrations of the front group lenses and the rear group lenses are counteracted with each other.

In an exemplary implementation, the optical imaging lens assembly of the present disclosure may satisfy: $1.5 < (R11-R12)/(R11+R12) < 2.0$, where R11 is a radius of curvature of the object-side surface of the sixth lens, and R12 is a radius of curvature of the image-side surface of the sixth lens. More specifically, R11 and R12 may further satisfy: $1.54 \leq (R11-R12)/(R11+R12) \leq 1.84$. By constraining the ratio of the difference between the radii of curvature of the object-side surface and image-side surface of the sixth lens to the sum of the radii of curvature of the object-side surface and the image-side surface of the sixth lens, the coma of the on-axis field of view or the off-axis field of view is small, so that the optical imaging lens assembly has a good imaging quality.

In an exemplary implementation, the optical imaging lens assembly of the present disclosure may satisfy: $TTL/ImgH \leq 1.4$, where TTL is a distance on the optical axis from a center of the object-side surface of the first lens to an image plane of the optical imaging lens assembly, and ImgH is half of a diagonal length of an effective pixel area on the image plane of the optical imaging lens assembly. More specifically, TTL and ImgH may further satisfy: $1.36 \leq TTL/ImgH \leq 1.40$. By controlling the ratio of the total optical length to the image height of the optical imaging lens assembly, the characteristics such as ultra-thin and high pixels for the optical system may be achieved.

In an exemplary implementation, the optical imaging lens assembly of the present disclosure may satisfy: $4.0 < R2/R1 < 5.0$, where R2 is a radius of curvature of the image-side surface of the first lens, and R1 is a radius of curvature of the object-side surface of the first lens. More specifically, R2 and R1 may further satisfy: $4.5 < R2/R1 < 4.9$, for example, $4.57 \leq R2/R \leq 54.88$. By constraining the ratio of the radius of curvature of the object-side surface to the radius of curvature of the image-side surface of the first lens, the amount of contribution of the first lens to the astigmatism of the optical imaging lens assembly may be controlled appropriately.

In an exemplary implementation, the optical imaging lens assembly of the present disclosure may satisfy: $1.05 \leq T56/T23 \leq 2.0$, where T56 is a spaced distance on the optical axis between the fifth lens and the sixth lens, and T23 is a spaced distance on the optical axis between the second lens and the third lens. More specifically, T56 and T23 may further satisfy: $1.3 \leq T56/T23 \leq 1.9$, for example, $1.40 \leq T56/T23 \leq 1.87$. By constraining the ratio of the air interval on the optical axis between the fifth lens and the sixth lens to the air interval on the optical axis between the second lens and the third lens, the amount of field curvature contributed by each field of view of the system is controlled within a reasonable range.

In an exemplary implementation, the optical imaging lens assembly of the present disclosure may satisfy: −3.05≤f2/R4≤−1.5, where f2 is an effective focal length of the second lens, and R4 is a radius of curvature of the image-side surface of the second lens. More specifically, f2 and R4 may further satisfy: −2.98≤f2/R4≤−1.56. By controlling the ratio of the effective focal length of the second lens to the radius of curvature of the image-side surface of the second lens, the amount of the field curvature contributed by the image-side surface of the second lens is controlled within a reasonable range to compensate the amount of the field curvature caused by subsequent lenses.

In an exemplary implementation, the optical imaging lens assembly of the present disclosure may satisfy: 2.2<CT1/CT2<3.2, where CT1 is a center thickness of the first lens on the optical axis, and CT2 is a center thickness of the second lens on the optical axis. More specifically, CT1 and CT2 may further satisfy: 2.38≤CT1/CT2≤3.09. By controlling the ratio of the central thickness of the first lens to the central thickness of the second lens, the amount of the distortion contributed by each field of view of the system is controlled within a reasonable range, such that the amount of distortion of the total system is within 3%, and thereby improving the imaging quality of the optical imaging lens assembly.

In an exemplary implementation, the optical imaging lens assembly described above may further include at least one diaphragm to improve the imaging quality of the lens assembly. The diaphragm may be disposed at any position as needed, for example, the diaphragm may be disposed between the object side and the first lens.

Alternatively, the optical imaging lens assembly described above may further include an optical filter for correcting chromatic aberration and/or a protective glass for protecting a photosensitive element on the image plane.

The optical imaging lens assembly according to the above implementations of the present disclosure may employ a plurality of lenses, such as the six lenses described above. By properly assigning the refractive power, the surface shape, the center thickness of each lens, and spaced distances on the optical axis between the lenses, the size and the sensitivity of the optical imaging lens assembly may be effectively reduced, and the processability of the optical imaging lens assembly may be improved, such that the optical imaging lens assembly is more advantageous for production processing and can be applied to portable electronic products. At the same time, the optical imaging lens assembly configured as described above also has advantageous effects such as large image plane, large aperture, high imaging quality, low sensitivity, and the like.

In the implementations of the present disclosure, at least one of the surfaces of each lens is aspheric. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. By using aspheric lens(es), the aberrations that occur during imaging may be eliminated as much as possible, and thus the imaging quality may be improved.

However, it will be understood by those skilled in the art that the number of lenses constituting the optical imaging lens assembly can be varied to achieve the various results and advantages described in this specification without departing from the technical solution claimed by the present disclosure. For example, although the implementation are described by employing six lenses as an example, the optical imaging lens assembly is not limited to including six lenses. The optical imaging lens assembly may also include other numbers of lenses if desired.

Specific embodiments applicable to the optical imaging lens assembly of the above implementations will be further described below with reference to the accompanying drawings.

Embodiment 1

An optical imaging lens assembly according to embodiment 1 of the present disclosure is described below with reference to FIG. 1 to FIG. 2D. FIG. 1 is a schematic structural view of an optical imaging lens assembly according to embodiment 1 of the present disclosure.

As shown in FIG. 1, the optical imaging lens assembly according to an exemplary implementation of the present disclosure includes, sequentially from an object side to an image side along an optical axis, a diaphragm STO, a first lens E1, a second lens E2, a third lens E3, a fourth lens E4, a fifth lens E5, a sixth lens E6, an optical filter E7 and an image plane S15.

The first lens E1 has a positive refractive power, and an object-side surface S1 thereof is a convex surface, and an image-side surface S2 thereof is a concave surface. The second lens E2 has a negative refractive power, and an object-side surface S3 thereof is a convex surface, and an image-side surface S4 thereof is a concave surface. The third lens E3 has a negative refractive power, and an object-side surface S5 thereof is a convex surface, and an image-side surface S6 thereof is a concave surface. The fourth lens E4 has a negative refractive power, and an object-side surface S7 thereof is a convex surface, and an image-side surface S8 thereof is a concave surface. The fifth lens E5 has a positive refractive power, and an object-side surface S9 thereof is a concave surface, and an image-side surface S10 thereof is a convex surface. The sixth lens E6 has a negative refractive power, and an object-side surface S11 thereof is a concave surface, and an image-side surface S12 thereof is a concave surface. The optical filter E7 has an object-side surface S13 and an image-side surface S14. Light from the object sequentially passes through the respective surfaces S1 to S14 and is finally imaged on the image plane S15.

Table 1 shows the surface type, radius of curvature, thickness, material and conic coefficient of each lens of the optical imaging lens assembly in embodiment 1, wherein the units for the radius of curvature and the thickness are millimeter (mm).

TABLE 1

| Surface number | Surface type | Radius of curvature | Thickness | Material Refractive index | Abbe number | Conic coefficient |
|---|---|---|---|---|---|---|
| OBJ | spherical | infinite | infinite | | | |
| STO | spherical | infinite | −0.5171 | | | |
| S1 | aspheric | 1.8560 | 0.7271 | 1.55 | 56.1 | −9.5131 |
| S2 | aspheric | 8.4822 | 0.0973 | | | 38.2434 |
| S3 | aspheric | 7.8200 | 0.2350 | 1.67 | 20.4 | −6.0492 |
| S4 | aspheric | 3.7790 | 0.4421 | | | −21.9580 |
| S5 | aspheric | 15.8959 | 0.3592 | 1.65 | 23.5 | −37.6459 |

TABLE 1-continued

| Surface number | Surface type | Radius of curvature | Thickness | Material Refractive index | Abbe number | Conic coefficient |
|---|---|---|---|---|---|---|
| S6 | aspheric | 15.1779 | 0.2308 | | | −68.4382 |
| S7 | aspheric | 3.1084 | 0.2350 | 1.67 | 20.4 | −55.2622 |
| S8 | aspheric | 2.6128 | 0.2199 | | | −30.9292 |
| S9 | aspheric | −24.4572 | 0.9226 | 1.55 | 56.1 | 53.4436 |
| S10 | aspheric | −1.4983 | 0.6174 | | | −5.1546 |
| S11 | aspheric | −8.3208 | 0.3971 | 1.54 | 55.7 | −1.8707 |
| S12 | aspheric | 1.7779 | 0.3733 | | | −7.7207 |
| S13 | spherical | infinite | 0.2100 | 1.52 | 64.2 | |
| S14 | spherical | infinite | 0.3332 | | | |
| S15 | spherical | infinite | | | | |

As can be seen from Table 1, the object-side surface and the image-side surface of any one of the first lens E1 to the sixth lens E6 are aspheric. In this embodiment, the surface shape x of each aspheric lens may be defined by using, but not limited to, the following aspheric formula:

$$x = \frac{ch^2}{1+\sqrt{1-(k+1)c^2h^2}} + \sum A_i h^i \quad (1)$$

Here, x is the sag—the axis-component of the displacement of the aspheric surface from the aspheric vertex, when the aspheric surface is at height h from the optical axis; c is the paraxial curvature of the aspheric surface, c=1/R (that is, the paraxial curvature c is reciprocal of the radius of curvature R in the above Table 1); k is the conic coefficient (given in Table 1); Ai is a correction coefficient for the i-th order of the aspheric surface. Table 2 below shows high-order coefficients A4, A6, A8, A10, A12, A14, A16, A18 and A20 applicable to each of aspheric surface S1-S12 in embodiment 1.

TABLE 2

| Surface number | A4 | A6 | A8 | A10 | A12 | A14 | A16 | A18 | A20 |
|---|---|---|---|---|---|---|---|---|---|
| S1 | 1.9316E−01 | −2.2775E−01 | 3.9266E−01 | −5.9614E−01 | 6.7343E−01 | −5.1468E−01 | 2.4826E−01 | −6.7880E−02 | 7.9590E−03 |
| S2 | −4.4940E−02 | 3.6530E−02 | −2.8680E−02 | 3.1480E−02 | −6.8790E−02 | 9.8788E−02 | −8.0290E−02 | 3.4127E−02 | −5.9400E−03 |
| S3 | −6.6290E−02 | 9.2331E−02 | −1.0438E−01 | 2.2564E−01 | −4.5771E−01 | 5.8646E−01 | −4.3986E−01 | 1.7831E−01 | −3.0070E−02 |
| S4 | 1.5441E−02 | 6.1649E−02 | −1.9317E−01 | 6.1916E−01 | −1.2463E+00 | 1.5235E+00 | −1.0959E+00 | 4.2554E−01 | −6.7600E−02 |
| S5 | −6.8960E−02 | 9.4263E−02 | −4.2485E−01 | 9.9023E−01 | −1.4972E+00 | 1.3783E+00 | −7.2064E−01 | 1.7532E−01 | −6.7600E−03 |
| S6 | −1.1736E−01 | 1.3756E−01 | −2.1059E−01 | 5.6190E−02 | 2.7849E−01 | −4.8987E−01 | 3.8168E−01 | −1.4948E−01 | 2.3961E−02 |
| S7 | −7.7190E−02 | −1.3450E−01 | 3.1250E−01 | −3.6450E−01 | 2.1838E−01 | −4.8260E−02 | −1.1690E−02 | 7.9630E−03 | −1.1600E−03 |
| S8 | −5.2530E−02 | −1.1698E−01 | 2.4412E−01 | −2.6525E−01 | 1.7974E−01 | −7.5400E−02 | 1.8873E−02 | −2.5700E−03 | 1.4700E−04 |
| S9 | −3.7650E−02 | −7.2600E−02 | −8.9300E−03 | 3.4915E−02 | −2.7380E−02 | 1.0339E−02 | −2.1100E−03 | 2.2600E−04 | −9.9000E−06 |
| S10 | −1.0730E−01 | 6.8840E−02 | −4.1300E−02 | 1.4144E−02 | 7.8900E−04 | −1.9200E−03 | 5.3500E−04 | −6.3000E−05 | 2.7800E−06 |
| S11 | −1.1531E−01 | 5.0632E−02 | −1.4830E−02 | 3.5430E−03 | −6.1000E−04 | 6.9500E−05 | −4.9000E−06 | 1.9100E−07 | −3.2000E−09 |
| S12 | −6.3560E−02 | 2.5972E−02 | −7.6100E−03 | 1.4240E−03 | −1.7000E−04 | 1.0900E−05 | −3.0000E−07 | −3.3000E−09 | 2.5700E−10 |

Table 3 shows effective focal lengths f1 to f6 of each lens, the total effective focal length f of the optical imaging lens assembly, a distance TTL on the optical axis from the center of the object-side surface S1 of the first lens E1 to the image plane S15, and half of the diagonal length ImgH of an effective pixel area on the image plane S15 in embodiment 1.

TABLE 3

| f1 (mm) | 4.19 | f6 (mm) | −2.69 |
|---|---|---|---|
| f2 (mm) | −11.25 | f (mm) | 4.22 |
| f3 (mm) | −649.32 | TTL (mm) | 5.40 |
| f4 (mm) | −30.37 | ImgH (mm) | 3.90 |
| f5 (mm) | 2.88 | | |

The optical imaging lens assembly in embodiment 1 satisfy:

f×tan(HFOV)=3.81, where f is the total effective focal length of the optical imaging lens assembly, and HFOV is half of a maximal field-of-view of the optical imaging lens assembly;

f5/CT2=12.27, where f5 is an effective focal length of the fifth lens E5, and CT2 is the center thickness of the second lens E2 on the optical axis;

f/EPD=1.65, where f is the total effective focal length of the optical imaging lens assembly, and EPD is an entrance pupil diameter of the optical imaging lens assembly;

f2/f=−2.66, where f2 is an effective focal length of the second lens E2, and f is the total effective focal length of the optical imaging lens assembly;

f/f5=1.46, where f is the total effective focal length of the optical imaging lens assembly, and f5 is the effective focal length of the fifth lens E5;

f1/f6=−1.56, where f1 is an effective focal length of the first lens E1, and f6 is an effective focal length of the sixth lens;

(R11−R12)/(R11+R12)=1.54, where R11 is a radius of curvature of the object-side surface S11 of the sixth lens E6, and R12 is a radius of curvature of the image-side surface S12 of the sixth lens E6;

TTL/ImgH=1.38, where TTL is the distance on the optical axis from the center of the object-side surface S1 of the first lens E1 to the image plane S15, and ImgH is half of the diagonal length of the effective pixel area on the image plane S15;

R2/R1=4.57, where R2 is a radius of curvature of the image-side surface S2 of the first lens E1, and R1 is a radius of curvature of the object-side surface S1 of the first lens E1;

T56/T23=1.40, where T56 is the spaced distance on the optical axis between the fifth lens E5 and the sixth lens E6, and T23 is the spaced distance on the optical axis between the second lens E2 and the third lens E3;

f2/R4=−2.98, where f2 is the effective focal length of the second lens E2, and R4 is the radius of curvature of the image-side surface S4 of the second lens E2;

CT1/CT2=3.09, where CT1 is the center thickness of the first lens E1 on the optical axis, and Ct2 is the center thickness of the second lens E2 on the optical axis.

Figure 2A:
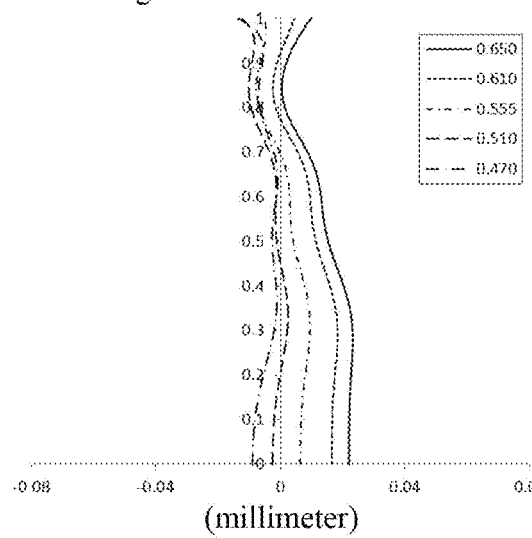
FIGS. 2A to 2D illustrate a longitudinal aberration curve, an astigmatism curve, a distortion curve and a lateral color curve of the optical imaging lens assembly according to embodiment 1, respectively.
Figure 2B:
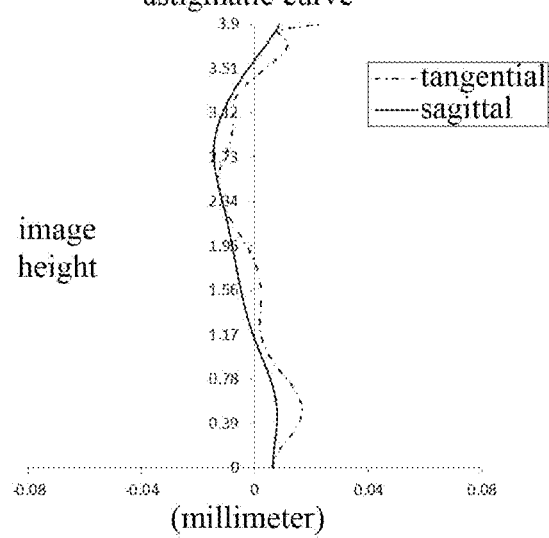
Figure 2C:
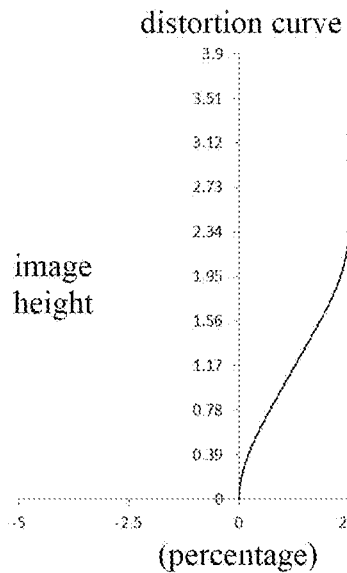
Figure 2D:
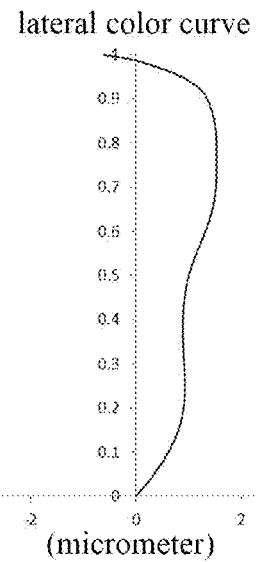

FIG. 2A illustrates a longitudinal aberration curve of the optical imaging lens assembly according to embodiment 1, representing deviations of focal points converged by light of different wavelengths after passing through the optical imaging lens assembly. FIG. 2B illustrates an astigmatism curve of the optical imaging lens assembly according to embodiment 1, representing a curvature of a tangential plane and a curvature of a sagittal plane. FIG. 2C illustrates a distortion curve of the optical imaging lens assembly according to embodiment 1, representing amounts of distortion at different viewing angles. FIG. 2D illustrates a lateral color curve of the optical imaging lens assembly according to embodiment 1, representing deviations of different image heights on an image plane after light passes through the optical imaging lens assembly. It can be seen from FIG. 2A to FIG. 2D that the optical imaging lens assembly provided in embodiment 1 may achieve good image quality.

Embodiment 2

Figure 3:
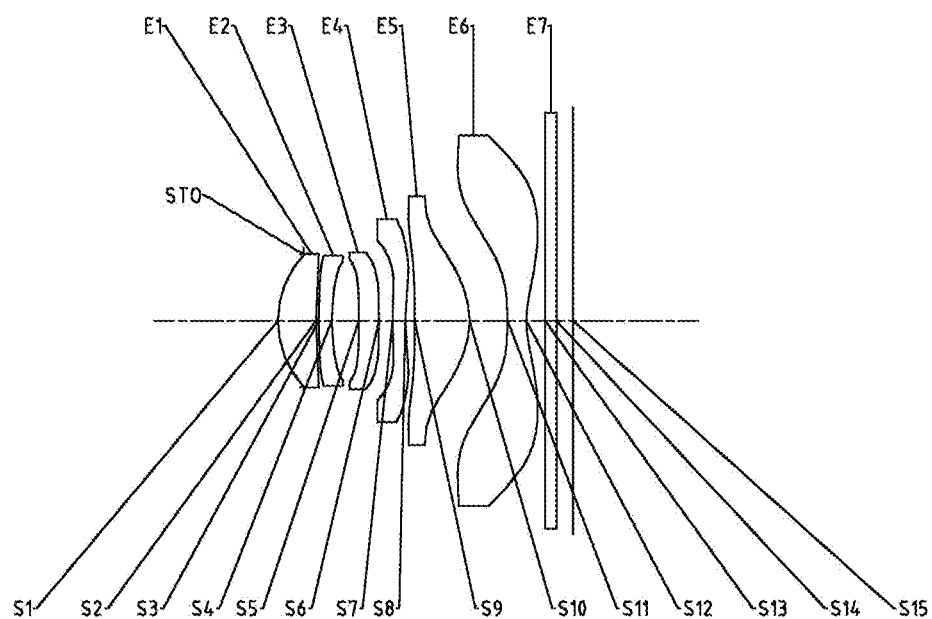
FIG. 3 is a schematic structural view of an optical imaging lens assembly according to embodiment 2 of the present disclosure.

An optical imaging lens assembly according to embodiment 2 of the present disclosure is described below with reference to FIG. 3 to FIG. 4D. In this embodiment and the following embodiments, for the purpose of brevity, the description of parts similar to those in embodiment 1 will be omitted. FIG. 3 is a schematic structural view of the optical imaging lens assembly according to embodiment 2 of the present disclosure.

As shown in FIG. 3, the optical imaging lens assembly according to an exemplary implementation of the present disclosure includes, sequentially from an object side to an image side along an optical axis, a diaphragm STO, a first lens E1, a second lens E2, a third lens E3, a fourth lens E4, a fifth lens E5, a sixth lens E6, an optical filter E7 and an image plane S15.

The first lens E1 has a positive refractive power, and an object-side surface S1 thereof is a convex surface, and an image-side surface S2 thereof is a concave surface. The second lens E2 has a negative refractive power, and an object-side surface S3 thereof is a convex surface, and an image-side surface S4 thereof is a concave surface. The third lens E3 has a positive refractive power, and an object-side surface S5 thereof is a concave surface, and an image-side surface S6 thereof is a convex surface. The fourth lens E4 has a negative refractive power, and an object-side surface S7 thereof is a convex surface, and an image-side surface S8 thereof is a concave surface. The fifth lens E5 has a positive refractive power, and an object-side surface S9 thereof is a convex surface, and an image-side surface S10 thereof is a convex surface. The sixth lens E6 has a negative refractive power, and an object-side surface S11 thereof is a concave surface, and an image-side surface S12 thereof is a concave surface. The optical filter E7 has an object-side surface S13 and an image-side surface S14. Light from the object sequentially passes through the respective surfaces S1 to S14 and is finally imaged on the image plane S15.

Table 4 shows surface type, radius of curvature, thickness, material and conic coefficient of each lens of the optical imaging lens assembly in embodiment 2, wherein the units for the radius of curvature and the thickness are millimeter (mm).

TABLE 4

| Surface number | Surface type | Radius of curvature | Thickness | Material Refractive index | Abbe number | Conic coefficient |
|---|---|---|---|---|---|---|
| OBJ | spherical | infinite | infinite | | | |
| STO | spherical | infinite | −0.4753 | | | |
| S1 | aspheric | 1.8151 | 0.7048 | 1.55 | 56.1 | −9.0135 |
| S2 | aspheric | 8.6785 | 0.0488 | | | 36.3432 |
| S3 | aspheric | 8.2802 | 0.2388 | 1.67 | 20.4 | 0.6387 |
| S4 | aspheric | 3.9815 | 0.5012 | | | −20.2735 |
| S5 | aspheric | −36656.4000 | 0.3734 | 1.65 | 23.5 | 99.0000 |
| S6 | aspheric | −506.6790 | 0.2500 | | | 99.0000 |
| S7 | aspheric | 3.5374 | 0.2350 | 1.67 | 20.4 | −58.6105 |
| S8 | aspheric | 2.5386 | 0.1740 | | | −26.7672 |
| S9 | aspheric | 93.5442 | 1.0132 | 1.55 | 56.1 | −99.0000 |
| S10 | aspheric | −1.5653 | 0.7026 | | | −5.8674 |
| S11 | aspheric | −6.3987 | 0.3453 | 1.54 | 55.7 | −1.9703 |
| S12 | aspheric | 1.8122 | 0.3464 | | | −8.0217 |
| S13 | spherical | infinite | 0.2100 | 1.52 | 64.2 | |
| S14 | spherical | infinite | 0.3064 | | | |
| S15 | spherical | infinite | | | | |

As can be seen from Table 4, in embodiment 2, the object-side surface and the image-side surface of any one of the first lens E1 to the sixth lens E6 are aspheric. Table 5 shows high-order coefficients applicable to each aspheric surface in embodiment 2, wherein the surface shape of each aspheric surface may be defined by the formula (1) given in the above embodiment 1.

TABLE 5

| Surface number | A4 | A6 | A8 | A10 | A12 | A14 | A16 | A18 | A20 |
|---|---|---|---|---|---|---|---|---|---|
| S1 | 1.8670E−01 | −1.6030E−01 | 1.6667E−01 | −1.4876E−01 | 1.3836E−01 | −1.2728E−01 | 8.6078E−02 | −3.3350E−02 | 5.3340E−03 |
| S2 | −7.1090E−02 | 6.7134E−02 | 8.0757E−02 | −4.4187E−01 | 7.9798E−01 | −8.0171E−01 | 4.5695E−01 | −1.3370E−01 | 1.4734E−02 |
| S3 | −8.8540E−02 | 1.8407E−01 | −3.5586E−01 | 8.0170E−01 | −1.4487E+00 | 1.7282E+00 | −1.2591E+00 | 5.0960E−01 | −8.7560E−02 |
| S4 | 2.2025E−02 | 2.4783E−02 | 9.9500E−03 | 8.8048E−02 | −5.6023E−01 | 1.1650E+00 | −1.1796E+00 | 5.9466E−01 | −1.1770E−01 |
| S5 | −6.8340E−02 | 7.2290E−02 | −4.4155E−01 | 1.2418E+00 | −2.2690E+00 | 2.5739E+00 | −1.7351E+00 | 6.1826E−01 | −8.5020E−02 |
| S6 | −9.4840E−02 | 5.1826E−02 | −3.6460E−02 | −1.5248E−01 | 3.9839E−01 | −4.8071E−01 | 3.3045E−01 | −1.2477E−01 | 2.0263E−02 |
| S7 | −1.1772E−01 | 2.0060E−03 | 7.8830E−03 | 1.2119E−01 | −2.9399E−01 | 2.9993E−01 | −1.5875E−01 | 4.2969E−02 | −4.7300E−03 |
| S8 | −5.0670E−02 | −1.1568E−01 | 2.5001E−01 | −2.6690E−01 | 1.7411E−01 | −7.0500E−02 | 1.7186E−02 | −2.3000E−03 | 1.3000E−04 |
| S9 | −1.7580E−02 | −4.5350E−02 | 5.5746E−02 | −3.0110E−02 | 9.6630E−03 | −2.0000E−03 | 2.7200E−04 | −2.3000E−05 | 9.0200E−07 |
| S10 | −1.0240E−01 | 7.1429E−02 | −4.3790E−02 | 1.6848E−02 | −2.0700E−03 | −5.5000E−04 | 2.1400E−04 | −2.6000E−05 | 1.1500E−06 |
| S11 | −1.1273E−01 | 4.9026E−02 | −1.4460E−02 | 3.4990E−03 | −6.1000E−04 | 6.8500E−05 | −4.8000E−06 | 1.8400E−07 | −3.1000E−09 |
| S12 | −6.2250E−02 | 2.5099E−02 | −7.2800E−03 | 1.4220E−03 | −1.9000E−04 | 1.6200E−05 | −8.6000E−07 | 2.5300E−08 | −3.2000E−10 |

Table 6 shows effective focal lengths f1 to f6 of each lens, the total effective focal length f of the optical imaging lens assembly, a distance TTL on the optical axis from the center of the object-side surface S1 of the first lens E1 to the image plane S15, and half of the diagonal length ImgH of an effective pixel area on the image plane S15 in embodiment 2.

TABLE 6

| f1 (mm) | 4.06 | f6 (mm) | −2.59 |
|---|---|---|---|
| f2 (mm) | −11.78 | f (mm) | 4.23 |
| f3 (mm) | 798.44 | TTL (mm) | 5.45 |
| f4 (mm) | −14.91 | ImgH (mm) | 3.93 |
| f5 (mm) | 2.83 | | |

Figure 4A:
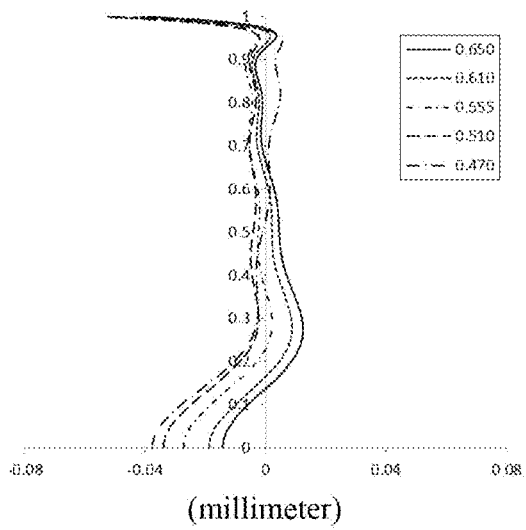
FIGS. 4A to 4D illustrate a longitudinal aberration curve, an astigmatism curve, a distortion curve and a lateral color curve of the optical imaging lens assembly according to embodiment 2, respectively.
Figure 4B:
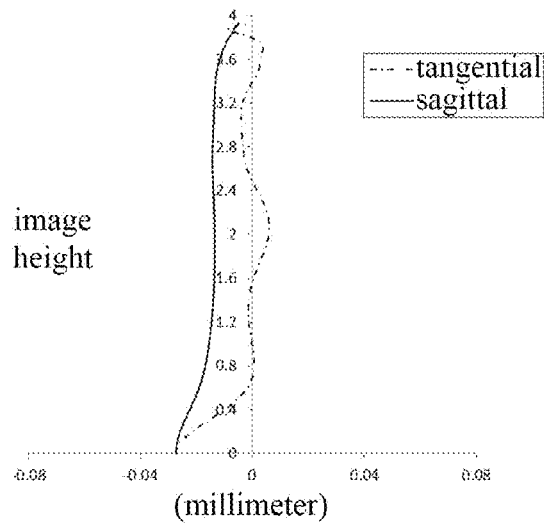
Figure 4C:
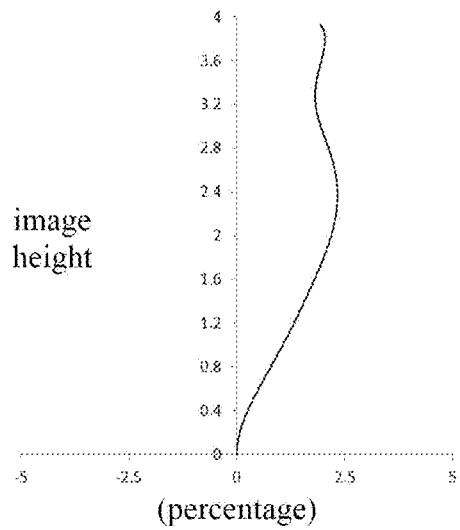
Figure 4D:
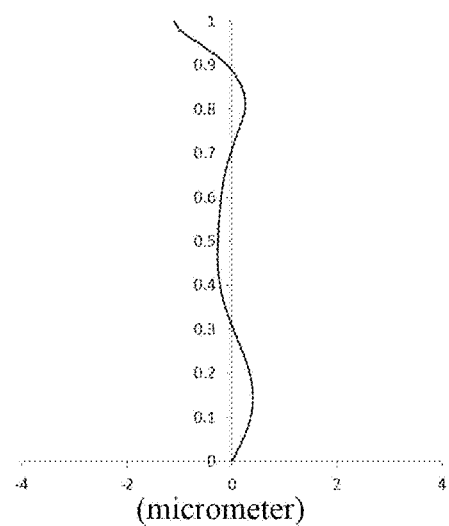

FIG. 4A illustrates a longitudinal aberration curve of the optical imaging lens assembly according to embodiment 2, representing deviations of focal points converged by light of different wavelengths after passing through the optical imaging lens assembly. FIG. 4B illustrates an astigmatism curve of the optical imaging lens assembly according to embodiment 2, representing a curvature of a tangential plane and a curvature of a sagittal plane. FIG. 4C illustrates a distortion curve of the optical imaging lens assembly according to embodiment 2, representing amounts of distortion at different viewing angles. FIG. 4D illustrates a lateral color curve of the optical imaging lens assembly according to embodiment 2, representing deviations of different image heights on an image plane after light passes through the optical imaging lens assembly. It can be seen from FIG. 4A to FIG. 4D that the optical imaging lens assembly provided in embodiment 2 may achieve good image quality.

Embodiment 3

An optical imaging lens assembly according to embodiment 3 of the present disclosure is described below with reference to FIG. 5 to FIG. 6D. FIG. 5 is a schematic structural view of the optical imaging lens assembly according to embodiment 3 of the present disclosure.

As shown in FIG. 5, the optical imaging lens assembly according to an exemplary implementation of the present disclosure includes, sequentially from an object side to an image side along an optical axis, a diaphragm STO, a first lens E1, a second lens E2, a third lens E3, a fourth lens E4, a fifth lens E5, a sixth lens E6, an optical filter E7 and an image plane S15.

The first lens E1 has a positive refractive power, and an object-side surface S1 thereof is a convex surface, and an image-side surface S2 thereof is a concave surface. The second lens E2 has a negative refractive power, and an object-side surface S3 thereof is a convex surface, and an image-side surface S4 thereof is a concave surface. The third lens E3 has a positive refractive power, and an object-side surface S5 thereof is a convex surface, and an image-side surface S6 thereof is a convex surface. The fourth lens E4 has a negative refractive power, and an object-side surface S7 thereof is a convex surface, and an image-side surface S8 thereof is a concave surface. The fifth lens E5 has a positive refractive power, and an object-side surface S9 thereof is a convex surface, and an image-side surface S10 thereof is a convex surface. The sixth lens E6 has a negative refractive power, and an object-side surface S11 thereof is a concave surface, and an image-side surface S12 thereof is a concave surface. The optical filter E7 has an object-side surface S13 and an image-side surface S14. Light from the object sequentially passes through the respective surfaces S1 to S14 and is finally imaged on the image plane S15.

Table 7 shows surface type, radius of curvature, thickness, material and conic coefficient of each lens of the optical imaging lens assembly in embodiment 3, wherein the units for the radius of curvature and the thickness are millimeter (mm).

TABLE 7

| Surface number | Surface type | Radius of curvature | Thickness | Refractive index | Abbe number | Conic coefficient |
|---|---|---|---|---|---|---|
| OBJ | spherical | infinite | infinite | | | |
| STO | spherical | infinite | −0.4695 | | | |
| S1 | aspheric | 1.8128 | 0.7062 | 1.55 | 56.1 | −9.0161 |
| S2 | aspheric | 8.7171 | 0.0480 | | | 37.2040 |
| S3 | aspheric | 8.1705 | 0.2403 | 1.67 | 20.4 | 1.3495 |
| S4 | aspheric | 3.9314 | 0.4985 | | | −19.9848 |
| S5 | aspheric | 820.0739 | 0.3753 | 1.65 | 23.5 | −99.0000 |
| S6 | aspheric | −164.6270 | 0.2641 | | | 99.0000 |
| S7 | aspheric | 3.8093 | 0.2350 | 1.67 | 20.4 | −59.4942 |
| S8 | aspheric | 2.6510 | 0.1660 | | | −26.7311 |
| S9 | aspheric | 59.8191 | 1.0139 | 1.55 | 56.1 | −99.0000 |
| S10 | aspheric | −1.5897 | 0.7135 | | | −5.9488 |
| S11 | aspheric | −6.1889 | 0.3325 | 1.54 | 55.7 | −1.8098 |
| S12 | aspheric | 1.8297 | 0.3434 | | | −8.1693 |
| S13 | spherical | infinite | 0.2100 | 1.52 | 64.2 | |
| S14 | spherical | infinite | 0.3033 | | | |
| S15 | spherical | infinite | | | | |

As can be seen from Table 7, in embodiment 3, the object-side surface and the image-side surface of any one of the first lens E1 to the sixth lens E6 are aspheric. Table 8 shows high-order coefficients applicable to each aspheric surface in embodiment 3, wherein the surface shape of each aspheric surface may be defined by the formula (1) given in the above embodiment 1.

TABLE 8

| Surface number | A4 | A6 | A8 | A10 | A12 | A14 | A16 | A18 | A20 |
|---|---|---|---|---|---|---|---|---|---|
| S1 | 1.8427E−01 | −1.3752E−01 | 6.9792E−02 | 8.6539E−02 | −2.1074E−01 | 1.9358E−01 | −9.1930E−02 | 2.1141E−02 | −1.7100E−03 |
| S2 | −7.4210E−02 | 7.4385E−02 | 7.4998E−02 | −4.4125E−01 | 7.8856E−01 | −7.7008E−01 | 4.1971E−01 | −1.1394E−01 | 1.0731E−02 |
| S3 | −9.1660E−02 | 1.8657E−01 | −3.2365E−01 | 6.6748E−01 | −1.1885E+00 | 1.4414E+00 | −1.0761E+00 | 4.4710E−01 | −7.8790E−02 |
| S4 | 2.3552E−02 | 4.5780E−03 | 1.5359E−01 | −4.3497E−01 | 5.5938E−01 | −2.9069E−01 | −5.0010E−02 | 1.1401E−01 | −3.1400E−02 |
| S5 | −7.5340E−02 | 1.1094E−01 | −6.1912E−01 | 1.7380E+00 | −3.1304E+00 | 3.5069E+00 | −2.3473E+00 | 8.4031E−01 | −1.1900E−01 |
| S6 | −8.9010E−02 | 2.5627E−02 | 2.5839E−02 | −2.5914E−01 | 5.2506E−01 | −5.8146E−01 | 3.8143E−01 | −1.3954E−01 | 2.2132E−02 |
| S7 | −1.1920E−01 | 8.7760E−03 | −1.2410E−02 | 1.5814E−01 | −3.3642E−01 | 3.2969E−01 | −1.7107E−01 | 4.5759E−02 | −5.0000E−03 |
| S8 | −4.9320E−02 | −1.2154E−01 | 2.5723E−01 | −2.7156E−01 | 1.7601E−01 | −7.1030E−02 | 1.7292E−02 | −2.3200E−03 | 1.3100E−04 |
| S9 | −1.4010E−02 | −5.4330E−02 | 6.3581E−02 | −3.3140E−02 | 1.0008E−02 | −1.8800E−03 | 2.2200E−04 | −1.6000E−05 | 5.6800E−07 |
| S10 | −9.9010E−02 | 6.8458E−02 | −4.2270E−02 | 1.6624E−02 | −2.3300E−03 | −4.0000E−04 | 1.7800E−04 | −2.2000E−05 | 9.7600E−07 |
| S11 | −1.1579E−01 | 5.1724E−02 | −1.5740E−02 | 3.8650E−03 | −6.7000E−04 | 7.5700E−05 | −5.2000E−06 | 2.0300E−07 | −3.4000E−09 |
| S12 | −6.3780E−02 | 2.6330E−02 | −7.8200E−03 | 1.5700E−03 | −2.1000E−04 | 1.9300E−05 | −1.1000E−06 | 3.5000E−08 | −5.0000E−10 |

Table 9 shows effective focal lengths f1 to f6 of each lens, the total effective focal length f of the optical imaging lens assembly, a distance TTL on the optical axis from the center of the object-side surface S1 of the first lens E1 to the image plane S15, and half of the diagonal length ImgH of an effective pixel area on the image plane S15 in embodiment 3.

TABLE 9

| f1 (mm) | 4.05 | f6 (mm) | −2.59 |
|---|---|---|---|
| f2 (mm) | −11.65 | f (mm) | 4.23 |
| f3 (mm) | 213.10 | TTL (mm) | 5.45 |
| f4 (mm) | −14.25 | ImgH (mm) | 3.93 |
| f5 (mm) | 2.85 | | |

Figure 6C:
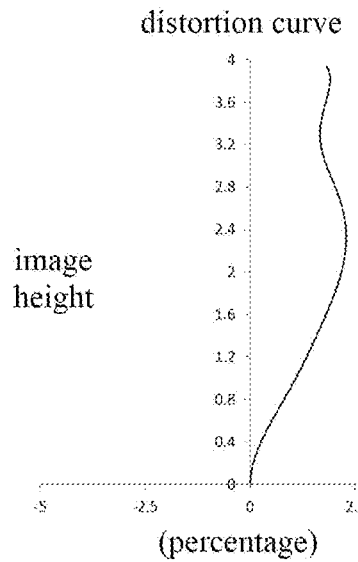
Figure 6D:
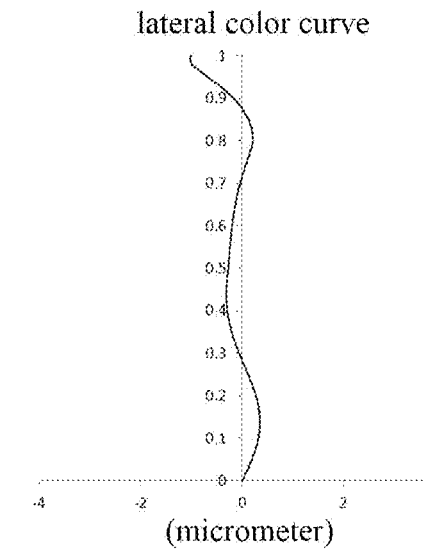

FIG. 6A illustrates a longitudinal aberration curve of the optical imaging lens assembly according to embodiment 3, representing deviations of focal points converged by light of different wavelengths after passing through the optical imaging lens assembly. FIG. 6B illustrates an astigmatism curve of the optical imaging lens assembly according to embodiment 3, representing a curvature of a tangential plane and a curvature of a sagittal plane. FIG. 6C illustrates a distortion curve of the optical imaging lens assembly according to embodiment 3, representing amounts of distortion at different viewing angles. FIG. 6D illustrates a lateral color curve of the optical imaging lens assembly according to embodiment 3, representing deviations of different image heights on an image plane after light passes through the optical imaging lens assembly. It can be seen from FIG. 6A to FIG. 6D that the optical imaging lens assembly provided in embodiment 3 may achieve good image quality.

Embodiment 4

Figure 7:
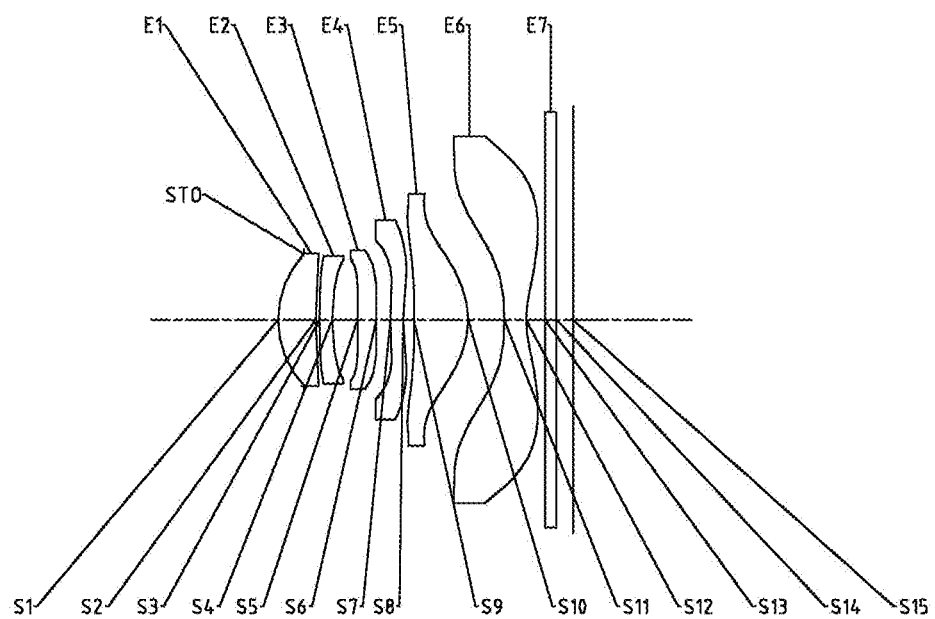
FIG. 7 is a schematic structural view of an optical imaging lens assembly according to embodiment 4 of the present disclosure.

An optical imaging lens assembly according to embodiment 4 of the present disclosure is described below with reference to FIG. 7 to FIG. 8D. FIG. 7 is a schematic structural view of the optical imaging lens assembly according to embodiment 4 of the present disclosure.

As shown in FIG. 7, the optical imaging lens assembly according to an exemplary implementation of the present disclosure includes, sequentially from an object side to an image side along an optical axis, a diaphragm STO, a first lens E1, a second lens E2, a third lens E3, a fourth lens E4, a fifth lens E5, a sixth lens E6, an optical filter E7 and an image plane S15.

The first lens E1 has a positive refractive power, and an object-side surface S1 thereof is a convex surface, and an image-side surface S2 thereof is a concave surface. The second lens E2 has a negative refractive power, and an object-side surface S3 thereof is a convex surface, and an image-side surface S4 thereof is a concave surface. The third lens E3 has a positive refractive power, and an object-side surface S5 thereof is a convex surface, and an image-side surface S6 thereof is a concave surface. The fourth lens E4 has a negative refractive power, and an object-side surface S7 thereof is a convex surface, and an image-side surface S8 thereof is a concave surface. The fifth lens E5 has a positive refractive power, and an object-side surface S9 thereof is a convex surface, and an image-side surface S10 thereof is a convex surface. The sixth lens E6 has a negative refractive power, and an object-side surface S11 thereof is a concave surface, and an image-side surface S12 thereof is a concave surface. The optical filter E7 has an object-side surface S13 and an image-side surface S14. Light from the object sequentially passes through the respective surfaces S1 to S14 and is finally imaged on the image plane S15.

Table 10 shows surface type, radius of curvature, thickness, material and conic coefficient of each lens of the optical imaging lens assembly in embodiment 4, wherein the units for the radius of curvature and the thickness are millimeter (mm).

TABLE 10

| Surface number | Surface type | Radius of curvature | Thickness | Material Refractive index | Abbe number | Conic coefficient |
|---|---|---|---|---|---|---|
| OBJ | spherical | infinite | infinite | | | |
| STO | spherical | infinite | −0.4773 | | | |
| S1 | aspheric | 1.8208 | 0.6933 | 1.55 | 56.1 | −9.0852 |
| S2 | aspheric | 8.5389 | 0.0688 | | | 36.1488 |
| S3 | aspheric | 8.6377 | 0.2352 | 1.67 | 20.4 | −2.2859 |
| S4 | aspheric | 3.8841 | 0.4676 | | | −20.5985 |
| S5 | aspheric | 15.8546 | 0.3488 | 1.65 | 23.5 | −98.8581 |
| S6 | aspheric | 19.2219 | 0.2596 | | | −73.5013 |
| S7 | aspheric | 3.1130 | 0.2350 | 1.67 | 20.4 | −58.1849 |
| S8 | aspheric | 2.3104 | 0.1993 | | | −27.4744 |
| S9 | aspheric | 103.8911 | 1.0016 | 1.55 | 56.1 | 69.1331 |
| S10 | aspheric | −1.5592 | 0.6669 | | | −5.7560 |
| S11 | aspheric | −6.8030 | 0.4042 | 1.54 | 55.7 | −1.8328 |
| S12 | aspheric | 1.8500 | 0.3499 | | | −7.5837 |
| S13 | spherical | infinite | 0.2100 | 1.52 | 64.2 | |
| S14 | spherical | infinite | 0.3098 | | | |
| S15 | spherical | infinite | | | | |

As can be seen from Table 10, in embodiment 4, the object-side surface and the image-side surface of any one of the first lens E1 to the sixth lens E6 are aspheric. Table shows high-order coefficients applicable to each aspheric surface in embodiment 4, wherein the surface shape of each aspheric surface may be defined by the formula (1) given in the above embodiment 1.

TABLE 11

| Surface number | A4 | A6 | A8 | A10 | A12 | A14 | A16 | A18 | A20 |
|---|---|---|---|---|---|---|---|---|---|
| S1 | 1.8388E−01 | −1.4572E−01 | 1.1171E−01 | −2.7050E−02 | −2.9250E−02 | 1.7485E−02 | 9.6960E−03 | −1.0770E−02 | 2.4670E−03 |
| S2 | −5.9080E−02 | 3.5846E−02 | 1.2928E−01 | −5.0150E−01 | 8.6281E−01 | −8.6137E−01 | 4.9907E−01 | −1.5314E−01 | 1.8809E−02 |
| S3 | −8.3240E−02 | 1.4411E−01 | −1.8849E−01 | 3.4867E−01 | −6.5443E−01 | 8.5022E−01 | −6.7041E−01 | 2.9049E−01 | −5.2810E−02 |
| S4 | 1.7734E−02 | 1.0331E−02 | 1.6163E−01 | −4.8858E−01 | 7.1108E−01 | −5.3231E−01 | 1.6354E−01 | 1.6389E−02 | −1.3840E−02 |
| S5 | −7.1790E−02 | 1.1153E−01 | −5.0724E−01 | 1.2876E+00 | −2.2317E+00 | 2.4756E+00 | −1.6599E+00 | 5.9485E−01 | −8.3550E−02 |
| S6 | −1.2076E−01 | 1.8995E−01 | −4.3604E−01 | 6.1388E−01 | −5.6450E−01 | 2.9759E−01 | −5.9300E−02 | −1.5270E−02 | 7.1550E−03 |
| S7 | −1.0252E−01 | −7.6650E−02 | 1.9987E−01 | −1.7155E−01 | −6.4600E−03 | 1.2358E−01 | −9.4840E−02 | 3.0667E−02 | −3.7800E−03 |
| S8 | −4.8100E−02 | −1.2008E−01 | 2.5015E−01 | −2.6695E−01 | 1.7762E−01 | −7.4040E−02 | 1.8631E−02 | −2.5800E−03 | 1.5000E−04 |
| S9 | −3.2050E−02 | −8.4100E−03 | 6.3300E−03 | 7.8400E−03 | −7.8000E−03 | 2.8880E−03 | −5.4000E−04 | 5.1100E−05 | −1.9000E−06 |
| S10 | −1.0857E−01 | 7.4120E−02 | −4.1610E−02 | 1.2312E−02 | 1.2500E−03 | −1.7900E−03 | 4.6200E−04 | −5.2000E−05 | 2.2100E−06 |

TABLE 11-continued

| Surface number | A4 | A6 | A8 | A10 | A12 | A14 | A16 | A18 | A20 |
|---|---|---|---|---|---|---|---|---|---|
| S11 | −1.0972E−01 | 4.6641E−02 | −1.3390E−02 | 3.2270E−03 | −5.7000E−04 | 6.6400E−05 | −4.8000E−06 | 1.9200E−07 | −3.3000E−09 |
| S12 | −6.0850E−02 | 2.4435E−02 | −7.3200E−03 | 1.5470E−03 | −2.3000E−04 | 2.4300E−05 | −1.6000E−06 | 6.4300E−08 | −1.1000E−09 |

Table 12 shows effective focal lengths f1 to f6 of each lens, the total effective focal length f of the optical imaging lens assembly, a distance TTL on the optical axis from the center of the object-side surface S1 of the first lens E1 to the image plane S15, and half of the diagonal length ImgH of an effective pixel area on the image plane S15 in embodiment 4.

TABLE 12

| f1 (mm) | 4.09 | f6 (mm) | −2.67 |
|---|---|---|---|
| f2 (mm) | −10.82 | f (mm) | 4.22 |
| f3 (mm) | 135.17 | TTL (mm) | 5.45 |
| f4 (mm) | −15.24 | ImgH (mm) | 3.93 |
| f5 (mm) | 2.82 | | |

Figure 8A:
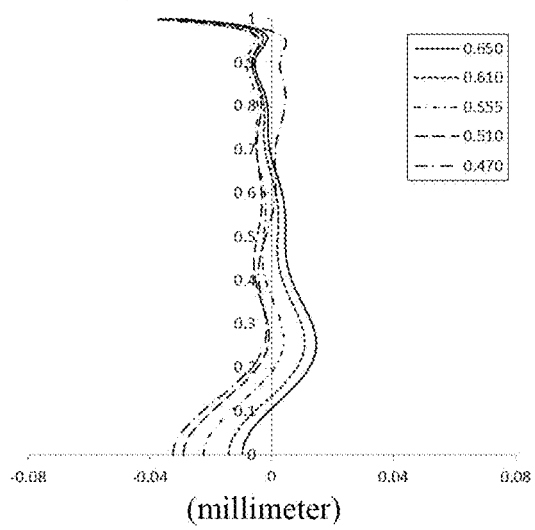
FIGS. 8A to 8D illustrate a longitudinal aberration curve, an astigmatism curve, a distortion curve and a lateral color curve of the optical imaging lens assembly according to embodiment 4, respectively.
Figure 8B:
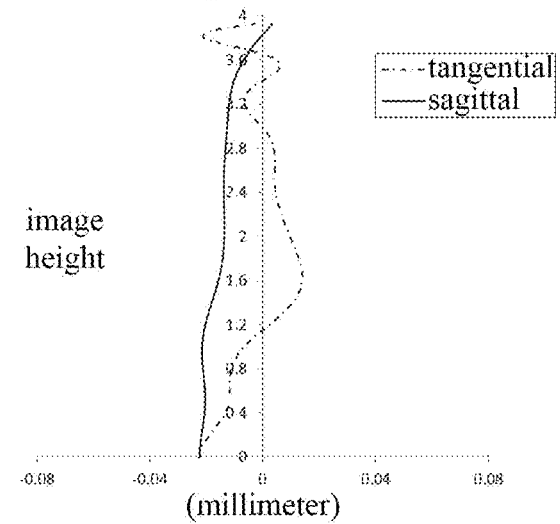
Figure 8C:
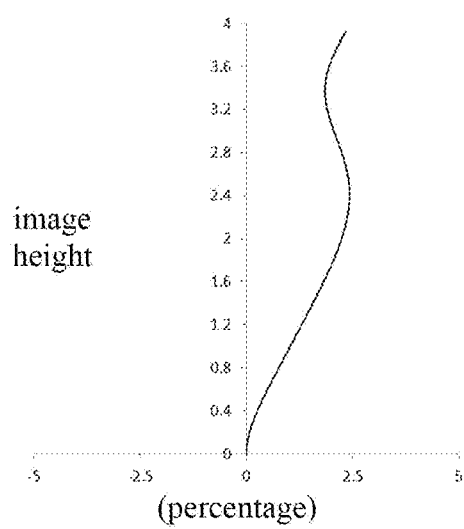
Figure 8D:
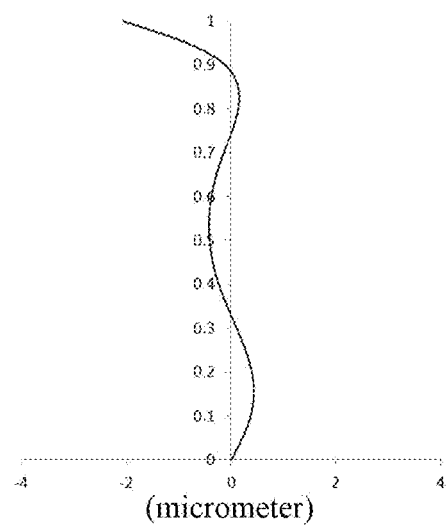

FIG. 8A illustrates a longitudinal aberration curve of the optical imaging lens assembly according to embodiment 4, representing deviations of focal points converged by light of different wavelengths after passing through the optical imaging lens assembly. FIG. 8B illustrates an astigmatism curve of the optical imaging lens assembly according to embodiment 4, representing a curvature of a tangential plane and a curvature of a sagittal plane. FIG. 8C illustrates a distortion curve of the optical imaging lens assembly according to embodiment 4, representing amounts of distortion at different viewing angles. FIG. 8D illustrates a lateral color curve of the optical imaging lens assembly according to embodiment 4, representing deviations of different image heights on an image plane after light passes through the optical imaging lens assembly. It can be seen from FIG. 8A to FIG. 8D that the optical imaging lens assembly provided in embodiment 4 may achieve good image quality.

Embodiment 5

Figure 9:
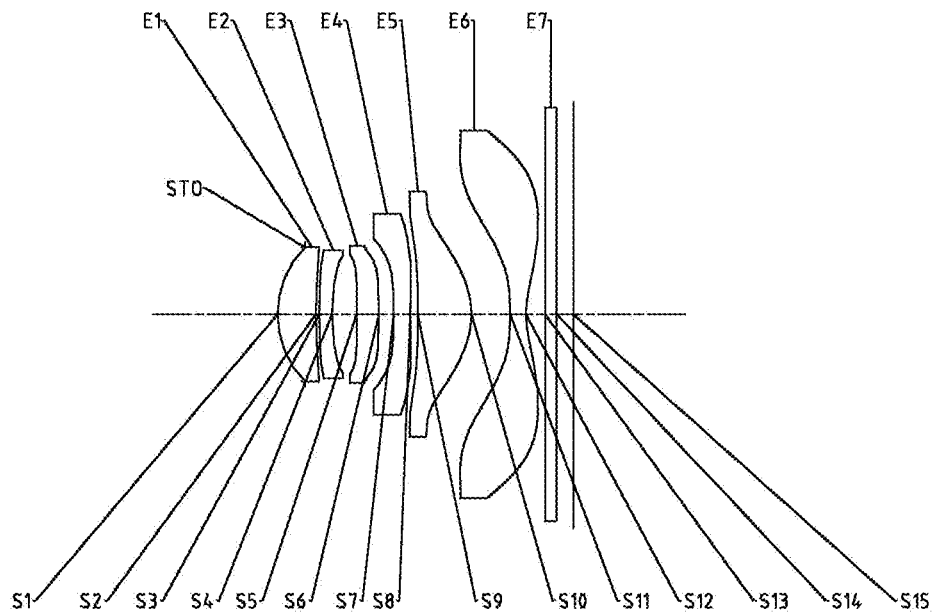
FIG. 9 is a schematic structural view of an optical imaging lens assembly according to embodiment 5 of the present disclosure.

An optical imaging lens assembly according to embodiment 5 of the present disclosure is described below with reference to FIG. 9 to FIG. 10D. FIG. 9 is a schematic structural view of the optical imaging lens assembly according to embodiment 5 of the present disclosure.

As shown in FIG. 9, the optical imaging lens assembly according to an exemplary implementation of the present disclosure includes, sequentially from an object side to an image side along an optical axis, a diaphragm STO, a first lens E1, a second lens E2, a third lens E3, a fourth lens E4, a fifth lens E5, a sixth lens E6, an optical filter E7 and an image plane S15.

The first lens E1 has a positive refractive power, and an object-side surface S1 thereof is a convex surface, and an image-side surface S2 thereof is a concave surface. The second lens E2 has a negative refractive power, and an object-side surface S3 thereof is a convex surface, and an image-side surface S4 thereof is a concave surface. The third lens E3 has a positive refractive power, and an object-side surface S5 thereof is a convex surface, and an image-side surface S6 thereof is a convex surface. The fourth lens E4 has a negative refractive power, and an object-side surface S7 thereof is a concave surface, and an image-side surface S8 thereof is a concave surface. The fifth lens E5 has a positive refractive power, and an object-side surface S9 thereof is a concave surface, and an image-side surface S10 thereof is a convex surface. The sixth lens E6 has a negative refractive power, and an object-side surface S11 thereof is a concave surface, and an image-side surface S12 thereof is a concave surface. The optical filter E7 has an object-side surface S13 and an image-side surface S14. Light from the object sequentially passes through the respective surfaces S1 to S14 and is finally imaged on the image plane S15.

Table 13 shows surface type, radius of curvature, thickness, material and conic coefficient of each lens of the optical imaging lens assembly in embodiment 5, wherein the units for the radius of curvature and the thickness are millimeter (mm).

TABLE 13

| Surface number | Surface type | Radius of curvature | Thickness | Refractive index | Abbe number | Conic coefficient |
|---|---|---|---|---|---|---|
| OBJ | spherical | infinite | infinite | | | |
| STO | spherical | infinite | −0.5033 | | | |
| S1 | aspheric | 1.8095 | 0.7076 | 1.55 | 56.1 | −8.9279 |
| S2 | aspheric | 8.2671 | 0.0597 | | | 35.3379 |
| S3 | aspheric | 8.2166 | 0.2350 | 1.67 | 20.4 | −1.5847 |
| S4 | aspheric | 3.9111 | 0.4544 | | | −20.4375 |
| S5 | aspheric | 19.5743 | 0.4092 | 1.65 | 23.5 | −90.4168 |
| S6 | aspheric | −35.3093 | 0.2723 | | | −91.5615 |
| S7 | aspheric | −112.4730 | 0.3044 | 1.67 | 20.4 | −99.0000 |
| S8 | aspheric | 6.2390 | 0.1380 | | | −26.8775 |
| S9 | aspheric | −865.5500 | 0.9929 | 1.55 | 56.1 | −99.0000 |
| S10 | aspheric | −1.5259 | 0.7108 | | | −5.7047 |
| S11 | aspheric | −6.8094 | 0.2901 | 1.54 | 55.7 | −1.9839 |
| S12 | aspheric | 1.7335 | 0.3528 | | | −7.6073 |
| S13 | spherical | infinite | 0.2100 | 1.52 | 64.2 | |
| S14 | spherical | infinite | 0.3127 | | | |
| S15 | spherical | infinite | | | | |

As can be seen from Table 13, in embodiment 5, the object-side surface and the image-side surface of any one of the first lens E1 to the sixth lens E6 are aspheric. Table shows high-order coefficients applicable to each aspheric surface in embodiment 5, wherein the surface shape of each aspheric surface may be defined by the formula (1) given in the above embodiment 1.

TABLE 14

| Surface number | A4 | A6 | A8 | A10 | A12 | A14 | A16 | A18 | A20 |
|---|---|---|---|---|---|---|---|---|---|
| S1 | 1.9188E−01 | −1.9527E−01 | 2.8717E−01 | −3.8114E−01 | 4.0170E−01 | −3.0107E−01 | 1.4760E−01 | −4.2140E−02 | 5.2360E−03 |
| S2 | −6.6270E−02 | 5.2110E−02 | 9.1247E−02 | −3.8816E−01 | 6.0298E−01 | −5.0154E−01 | 2.1458E−01 | −3.4350E−02 | −1.5300E−03 |

TABLE 14-continued

| Surface number | A4 | A6 | A8 | A10 | A12 | A14 | A16 | A18 | A20 |
|---|---|---|---|---|---|---|---|---|---|
| S3 | −9.5610E−02 | 2.2351E−01 | −5.1137E−01 | 1.1854E+00 | −2.0357E+00 | 2.2952E+00 | −1.5945E+00 | 6.1947E−01 | −1.0269E−01 |
| S4 | 1.3614E−02 | 4.9204E−02 | −1.6770E−02 | −3.1000E−03 | −1.0592E−01 | 3.2163E−01 | −3.6682E−01 | 1.9152E−01 | −3.6360E−02 |
| S5 | −8.1450E−02 | 2.3779E−01 | −1.2516E+00 | 3.5472E+00 | −6.3181E+00 | 7.0280E+00 | −4.7263E+00 | 1.7386E+00 | −2.6391E−01 |
| S6 | −6.0750E−02 | −1.3270E−02 | −6.6870E−02 | 1.3015E−01 | −1.1742E−01 | −5.9200E−03 | 9.6926E−02 | −7.0060E−02 | 1.6439E−02 |
| S7 | −9.8620E−02 | −6.3930E−02 | 9.8944E−02 | 2.7019E−01 | −2.3613E−01 | 2.9101E−01 | −1.6832E−01 | 4.8343E−01 | −5.5900E−03 |
| S8 | −4.2020E−02 | −1.3406E−01 | 2.4237E−01 | −2.1730E−01 | 1.2362E−01 | −4.5860E−02 | 1.0651E−02 | −1.4000E−03 | 7.8300E−05 |
| S9 | 1.7413E−02 | −1.1552E−01 | 1.1803E−01 | −5.6870E−02 | 1.3465E−02 | −9.1000E−04 | −2.5000E−04 | 5.3800E−05 | −3.2000E−06 |
| S10 | −1.0175E−01 | 7.3764E−02 | −5.0820E−02 | 2.3282E−02 | −5.1500E−03 | 2.9800E−04 | 7.9500E−05 | −1.5000E−05 | 7.5200E−07 |
| S11 | −1.1537E−01 | 5.1834E−02 | −1.4950E−02 | 3.3880E−03 | −5.6000E−04 | 6.1900E−05 | −4.3000E−06 | 1.7000E−07 | −2.9000E−09 |
| S12 | −6.7990E−02 | 3.0520E−02 | −9.8100E−03 | 2.1750E−03 | −3.4000E−04 | 3.4900E−05 | −2.3000E−06 | 9.0700E−08 | −1.5000E−09 |

Table 15 shows effective focal lengths f1 to f6 of each lens, the total effective focal length f of the optical imaging lens assembly, a distance TTL on the optical axis from the center of the object-side surface S1 of the first lens E1 to the image plane S15, and half of the diagonal length ImgH of an effective pixel area on the image plane S15 in embodiment 5.

TABLE 15

| f1 (mm) | 4.09 | f6 (mm) | −2.54 |
|---|---|---|---|
| f2 (mm) | −11.46 | f (mm) | 4.23 |
| f3 (mm) | 19.63 | TTL (mm) | 5.45 |
| f4 (mm) | −8.87 | ImgH (mm) | 3.93 |
| f5 (mm) | 2.80 | | |

Figure 10A:
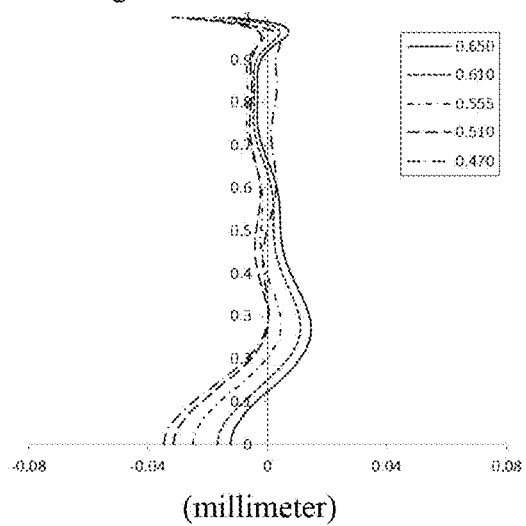
Figure 10B:
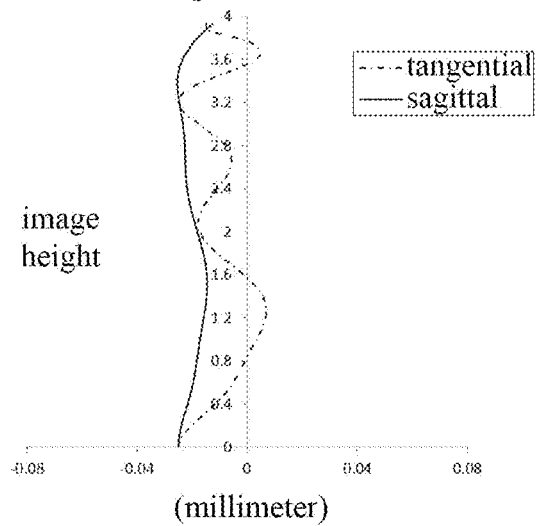

FIG. 10A illustrates a longitudinal aberration curve of the optical imaging lens assembly according to embodiment 5, representing deviations of focal points converged by light of different wavelengths after passing through the optical imaging lens assembly. FIG. 10B illustrates an astigmatism curve of the optical imaging lens assembly according to embodiment 5, representing a curvature of a tangential plane and a curvature of a sagittal plane. FIG. 10C illustrates a distortion curve of the optical imaging lens assembly according to embodiment 5, representing amounts of distortion at different viewing angles. FIG. 10D illustrates a lateral color curve of the optical imaging lens assembly according to embodiment 5, representing deviations of different image heights on an image plane after light passes through the optical imaging lens assembly. It can be seen from FIG. 10A to FIG. 10D that the optical imaging lens assembly provided in embodiment 5 may achieve good image quality.

Embodiment 6

An optical imaging lens assembly according to embodiment 6 of the present disclosure is described below with reference to FIG. 11 to FIG. 12D. FIG. 11 is a schematic structural view of the optical imaging lens assembly according to embodiment 6 of the present disclosure.

As shown in FIG. 11, the optical imaging lens assembly according to an exemplary implementation of the present disclosure includes, sequentially from an object side to an image side along an optical axis, a diaphragm STO, a first lens E1, a second lens E2, a third lens E3, a fourth lens E4, a fifth lens E5, a sixth lens E6, an optical filter E7 and an image plane S15.

The first lens E1 has a positive refractive power, and an object-side surface S1 thereof is a convex surface, and an image-side surface S2 thereof is a concave surface. The second lens E2 has a negative refractive power, and an object-side surface S3 thereof is a convex surface, and an image-side surface S4 thereof is a concave surface. The third lens E3 has a positive refractive power, and an object-side surface S5 thereof is a convex surface, and an image-side surface S6 thereof is a concave surface. The fourth lens E4 has a negative refractive power, and an object-side surface S7 thereof is a concave surface, and an image-side surface S8 thereof is a concave surface. The fifth lens E5 has a positive refractive power, and an object-side surface S9 thereof is a concave surface, and an image-side surface S10 thereof is a convex surface. The sixth lens E6 has a negative refractive power, and an object-side surface S11 thereof is a concave surface, and an image-side surface S12 thereof is a concave surface. The optical filter E7 has an object-side surface S13 and an image-side surface S14. Light from the object sequentially passes through the respective surfaces S1 to S14 and is finally imaged on the image plane S15.

Table 16 shows surface type, radius of curvature, thickness, material and conic coefficient of each lens of the optical imaging lens assembly in embodiment 6, wherein the units for the radius of curvature and the thickness are millimeter (mm).

TABLE 16

| Surface number | Surface type | Radius of curvature | Thickness | Material Refractive index | Abbe number | Conic coefficient |
|---|---|---|---|---|---|---|
| OBJ | spherical | infinite | infinite | | | |
| STO | spherical | infinite | −0.5037 | | | |
| S1 | aspheric | 1.8201 | 0.7245 | 1.55 | 56.1 | −8.9809 |
| S2 | aspheric | 8.5152 | 0.0794 | | | 35.5335 |
| S3 | aspheric | 8.7716 | 0.2387 | 1.67 | 20.4 | −3.4670 |
| S4 | aspheric | 3.8823 | 0.4485 | | | −20.7127 |
| S5 | aspheric | 16.7185 | 0.3832 | 1.65 | 23.5 | −99.0000 |
| S6 | aspheric | 931.0614 | 0.2500 | | | −99.0000 |
| S7 | aspheric | −66.5314 | 0.2864 | 1.67 | 20.4 | 19.9673 |
| S8 | aspheric | 10.0000 | 0.1965 | | | −22.8696 |
| S9 | aspheric | −25.2424 | 0.9347 | 1.55 | 56.1 | −99.0000 |
| S10 | aspheric | −1.5321 | 0.6667 | | | −5.8337 |
| S11 | aspheric | −7.9517 | 0.3427 | 1.54 | 55.7 | −2.0177 |
| S12 | aspheric | 1.7199 | 0.3794 | | | −7.3191 |
| S13 | spherical | infinite | 0.2100 | 1.52 | 64.2 | |
| S14 | spherical | infinite | 0.3393 | | | |
| S15 | spherical | infinite | | | | |

As can be seen from Table 16, in embodiment 6, the object-side surface and the image-side surface of any one of the first lens E1 to the sixth lens E6 are aspheric. Table shows high-order coefficients applicable to each aspheric surface in embodiment 6, wherein the surface shape of each aspheric surface may be defined by the formula (1) given in the above embodiment 1.

TABLE 17

| Surface number | A4 | A6 | A8 | A10 | A12 | A14 | A16 | A18 | A20 |
|---|---|---|---|---|---|---|---|---|---|
| S1 | 2.0547E−01 | −3.0789E−01 | 7.3082E−01 | −1.3980E+00 | 1.8266E+00 | −1.5372E+00 | 7.9389E−01 | −2.2822E−01 | 2.7832E−02 |
| S2 | −6.2310E−02 | 7.8798E−02 | −1.0982E−01 | 1.9679E−01 | −3.3508E−01 | 3.8805E−01 | −2.7585E−01 | 1.0819E−01 | −1.7950E−02 |
| S3 | −8.2850E−02 | 1.0521E−01 | 2.8579E−02 | −2.9969E−01 | 5.4551E−01 | −5.3829E−01 | 3.0623E−01 | −9.2130E−02 | 1.1108E−02 |
| S4 | 9.0400E−03 | 4.7708E−02 | −1.4930E−02 | 1.0051E−01 | −4.6773E−01 | 9.0278E−01 | −8.7823E−01 | 4.3044E−01 | −8.3420E−02 |
| S5 | −4.6170E−02 | −7.7010E−02 | 1.3478E−01 | −4.7270E−02 | −4.6842E−01 | 1.0170E+00 | −9.4394E−01 | 4.1429E−01 | −6.8160E−02 |
| S6 | −5.4140E−02 | −6.9870E−02 | 1.2490E−01 | −2.3462E−01 | 3.2561E−01 | −3.4616E−01 | 2.5414E−01 | −1.0862E−01 | 1.9951E−02 |
| S7 | −9.0470E−02 | −5.4040E−02 | 2.6430E−02 | 1.8597E−01 | −4.2803E−01 | 4.3684E−01 | −2.3741E−01 | 6.6552E−02 | −7.5800E−03 |
| S8 | −4.4810E−02 | −1.2634E−01 | 2.3563E−01 | −2.2558E−01 | 1.4046E−01 | −5.7290E−02 | 1.4519E−02 | −2.0500E−03 | 1.2300E−04 |
| S9 | 6.6540E−03 | −7.4170E−02 | 6.4329E−02 | −2.1290E−02 | −2.4000E−04 | 2.3310E−03 | −7.1000E−04 | 9.2400E−05 | −4.6000E−06 |
| S10 | −1.0461E−01 | 7.5204E−02 | −5.0970E−02 | 2.2711E−02 | −4.4800E−03 | −1.4000E−05 | 1.5100E−04 | −2.3000E−05 | 1.1300E−06 |
| S11 | −1.1219E−01 | 4.5457E−02 | −1.0270E−02 | 1.6810E−03 | −2.0000E−04 | 1.6800E−05 | −8.8000E−07 | 2.5800E−08 | −3.2000E−10 |
| S12 | −6.6050E−02 | 2.7836E−02 | −8.4100E−03 | 1.7440E−03 | −2.5000E−04 | 2.3900E−05 | −1.5000E−06 | 5.2500E−08 | −8.4000E−10 |

Table 18 shows effective focal lengths f1 to f6 of each lens, the total effective focal length f of the optical imaging lens assembly, a distance TTL on the optical axis from the center of the object-side surface S1 of the first lens E1 to the image plane S15, and half of the diagonal length ImgH of an effective pixel area on the image plane S15 in embodiment 6.

TABLE 18

| f1 (mm) | 4.08 | f6 (mm) | −2.60 |
|---|---|---|---|
| f2 (mm) | −10.67 | f (mm) | 4.35 |
| f3 (mm) | 26.45 | TTL (mm) | 5.48 |
| f4 (mm) | −13.04 | ImgH (mm) | 4.03 |
| f5 (mm) | 2.95 | | |

Figure 12A:
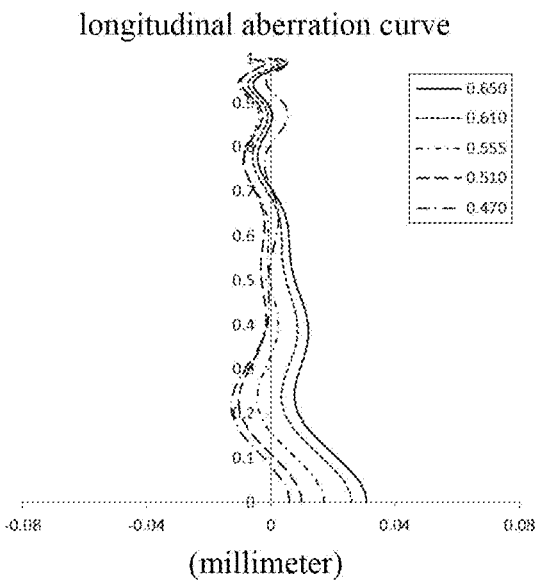
FIGS. 12A to 12D illustrate a longitudinal aberration curve, an astigmatism curve, a distortion curve and a lateral color curve of the optical imaging lens assembly according to embodiment 6, respectively.
Figure 12B:
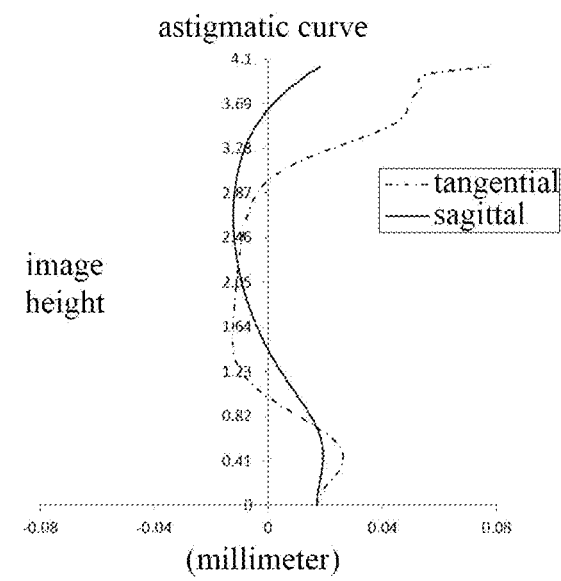
Figure 12C:
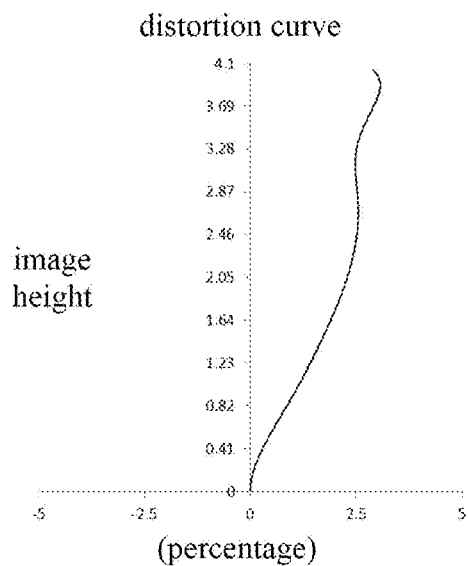
Figure 12D:
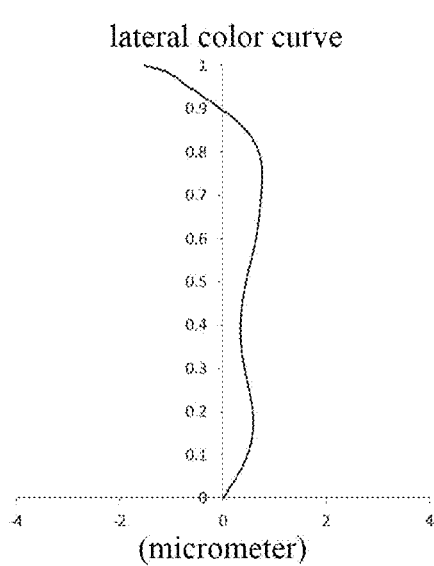

FIG. 12A illustrates a longitudinal aberration curve of the optical imaging lens assembly according to embodiment 6, representing deviations of focal points converged by light of different wavelengths after passing through the optical imaging lens assembly. FIG. 12B illustrates an astigmatism curve of the optical imaging lens assembly according to embodiment 6, representing a curvature of a tangential plane and a curvature of a sagittal plane. FIG. 12C illustrates a distortion curve of the optical imaging lens assembly according to embodiment 6, representing amounts of distortion at different viewing angles. FIG. 12D illustrates a lateral color curve of the optical imaging lens assembly according to embodiment 6, representing deviations of different image heights on an image plane after light passes through the optical imaging lens assembly. It can be seen from FIG. 12A to FIG. 12D that the optical imaging lens assembly provided in embodiment 6 may achieve good image quality.

Embodiment 7

An optical imaging lens assembly according to embodiment 7 of the present disclosure is described below with reference to FIG. 13 to FIG. 14D. FIG. 3 is a schematic structural view of the optical imaging lens assembly according to embodiment 7 of the present disclosure.

Figure 13:
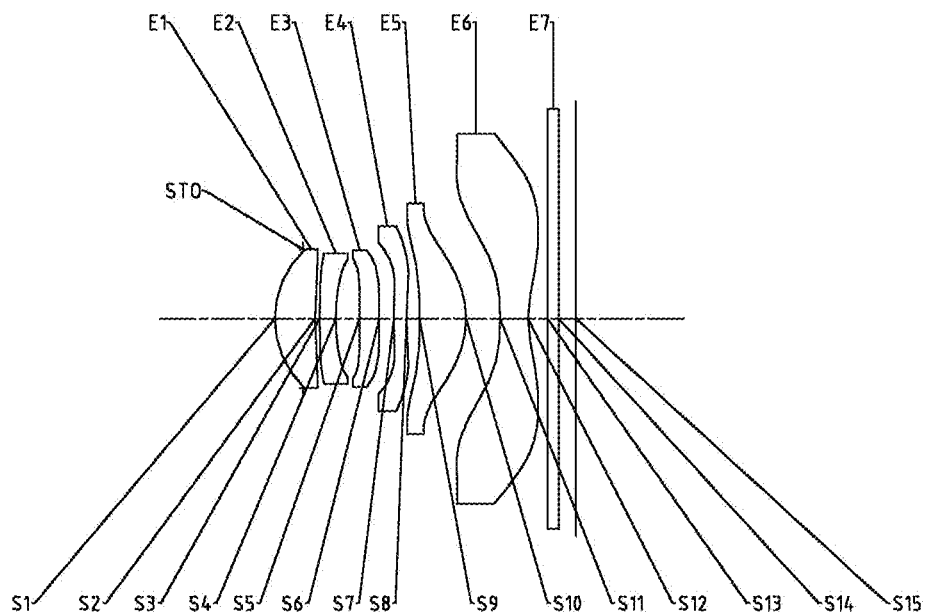
FIG. 13 is a schematic structural view of an optical imaging lens assembly according to embodiment 7 of the present disclosure.

As shown in FIG. 13, the optical imaging lens assembly according to an exemplary implementation of the present disclosure includes, sequentially from an object side to an image side along an optical axis, a diaphragm STO, a first lens E1, a second lens E2, a third lens E3, a fourth lens E4, a fifth lens E5, a sixth lens E6, an optical filter E7 and an image plane S15.

The first lens E1 has a positive refractive power, and an object-side surface S1 thereof is a convex surface, and an image-side surface S2 thereof is a concave surface. The second lens E2 has a negative refractive power, and an object-side surface S3 thereof is a convex surface, and an image-side surface S4 thereof is a concave surface. The third lens E3 has a positive refractive power, and an object-side surface S5 thereof is a convex surface, and an image-side surface S6 thereof is a concave surface. The fourth lens E4 has a negative refractive power, and an object-side surface S7 thereof is a convex surface, and an image-side surface S8 thereof is a concave surface. The fifth lens E5 has a positive refractive power, and an object-side surface S9 thereof is a concave surface, and an image-side surface S10 thereof is a convex surface. The sixth lens E6 has a negative refractive power, and an object-side surface S11 thereof is a concave surface, and an image-side surface S12 thereof is a concave surface. The optical filter E7 has an object-side surface S13 and an image-side surface S14. Light from the object sequentially passes through the respective surfaces S1 to S14 and is finally imaged on the image plane S15.

Table 19 shows surface type, radius of curvature, thickness, material and conic coefficient of each lens of the optical imaging lens assembly in embodiment 7, wherein the units for the radius of curvature and the thickness are millimeter (mm).

TABLE 19

| Surface number | Surface type | Radius of curvature | Thickness | Material Refractive index | Material Abbe number | Conic coefficient |
|---|---|---|---|---|---|---|
| OBJ | spherical | infinite | infinite | | | |
| STO | spherical | infinite | −0.5253 | | | |
| S1 | aspheric | 1.7823 | 0.7480 | 1.55 | 56.1 | −9.7761 |
| S2 | aspheric | 8.4204 | 0.0837 | | | 37.4336 |
| S3 | aspheric | 9.7484 | 0.3000 | 1.67 | 20.4 | −2.7750 |
| S4 | aspheric | 3.8299 | 0.4409 | | | −19.4249 |
| S5 | aspheric | 21.9488 | 0.3682 | 1.65 | 23.5 | −84.1330 |
| S6 | aspheric | 50.8322 | 0.2698 | | | −68.9956 |
| S7 | aspheric | 4.2464 | 0.2350 | 1.67 | 20.4 | −78.5603 |
| S8 | aspheric | 3.1929 | 0.2431 | | | −33.3177 |
| S9 | aspheric | −17.2265 | 0.8635 | 1.55 | 56.1 | −52.7367 |
| S10 | aspheric | −1.7277 | 0.6306 | | | −5.8637 |
| S11 | aspheric | −8.0448 | 0.5179 | 1.54 | 55.7 | −1.0624 |
| S12 | aspheric | 1.9486 | 0.3627 | | | −8.6670 |
| S13 | spherical | infinite | 0.2100 | 1.52 | 64.2 | |
| S14 | spherical | infinite | 0.3167 | | | |
| S15 | spherical | infinite | | | | |

As can be seen from Table 19, in embodiment 7, the object-side surface and the image-side surface of any one of the first lens E1 to the sixth lens E6 are aspheric. Table shows high-order coefficients applicable to each aspheric surface in embodiment 7, wherein the surface shape of each aspheric surface may be defined by the formula (1) given in the above embodiment 1.

TABLE 20

| Surface number | A4 | A6 | A8 | A10 | A12 | A14 | A16 | A18 | A20 |
|---|---|---|---|---|---|---|---|---|---|
| S1  | 2.1766E−01 | −2.5534E−01 | 4.0490E−01 | −5.7858E−01 | 6.5230E−01 | −5.1836E−01 | 2.6546E−01 | −7.7710E−02 | 9.7700E−03 |
| S2  | −5.6570E−02 | 7.3828E−02 | −1.7750E−01 | 4.4579E−01 | −7.8414E−01 | 8.5952E−01 | −5.6639E−01 | 2.0526E−01 | −3.1420E−02 |
| S3  | −6.4580E−02 | 1.1421E−01 | −2.0054E−01 | 4.3191E−01 | −7.0293E−01 | 7.3701E−01 | −4.6954E−01 | 1.6653E−01 | −2.5130E−02 |
| S4  | 3.6830E−02 | −6.1570E−02 | 4.8060E−01 | −1.4962E+00 | 2.8020E+00 | −3.2666E+00 | 2.3341E+00 | −9.3779E−01 | 1.6436E−01 |
| S5  | −7.9290E−02 | 1.7659E−01 | −8.3039E−01 | 2.1729E+00 | −3.6442E+00 | 3.8366E+00 | −2.4468E+00 | 8.5288E−01 | −1.2205E−01 |
| S6  | −9.4120E−02 | 5.8283E−02 | −7.6900E−02 | −3.9060E−02 | 2.1561E−01 | −3.0104E−01 | 2.2098E−01 | −8.6190E−02 | 1.4257E−02 |
| S7  | −1.0566E−01 | −6.3300E−02 | 1.4493E−01 | −1.1580E−01 | −1.1040E−02 | 8.0123E−02 | −5.3720E−02 | 1.5323E−02 | −1.6900E−03 |
| S8  | −7.4670E−02 | −7.2720E−02 | 1.6739E−01 | −1.7510E−01 | 1.1134E−01 | −4.2680E−02 | 9.3480E−03 | −1.0300E−03 | 4.0100E−05 |
| S9  | −2.9460E−02 | −1.9990E−02 | 1.8240E−03 | 2.3755E−02 | −1.9130E−02 | 6.9210E−03 | −1.3300E−03 | 1.3300E−04 | −5.4000E−06 |
| S10 | −9.7110E−02 | 5.3540E−02 | −2.7570E−02 | 6.9380E−03 | 2.5200E−03 | −1.9700E−03 | 4.7800E−04 | −5.2000E−05 | 2.1600E−06 |
| S11 | −1.2961E−01 | 6.4947E−02 | −2.1040E−02 | 5.1200E−03 | −8.7000E−04 | 9.5900E−05 | −6.6000E−06 | 2.5300E−07 | −4.2000E−09 |
| S12 | −6.1160E−02 | 2.4907E−02 | −7.2400E−03 | 1.4030E−03 | −1.8000E−04 | 1.5600E−05 | −8.2000E−07 | 2.4500E−08 | −3.2000E−10 |

Table 21 shows effective focal lengths f1 to f6 of each lens, the total effective focal length f of the optical imaging lens assembly, a distance TTL on the optical axis from the center of the object-side surface S1 of the first lens E1 to the image plane S15, and half of the diagonal length ImgH of an effective pixel area on the image plane S15 in embodiment 7.

TABLE 21

| | | | |
|---|---|---|---|
| f1 (mm) | 3.98 | f6 (mm) | −2.87 |
| f2 (mm) | −9.67 | f (mm) | 4.54 |
| f3 (mm) | 59.73 | TTL (mm) | 5.59 |
| f4 (mm) | −21.22 | ImgH (mm) | 4.03 |
| f5 (mm) | 3.45 | | |

Figure 14A:
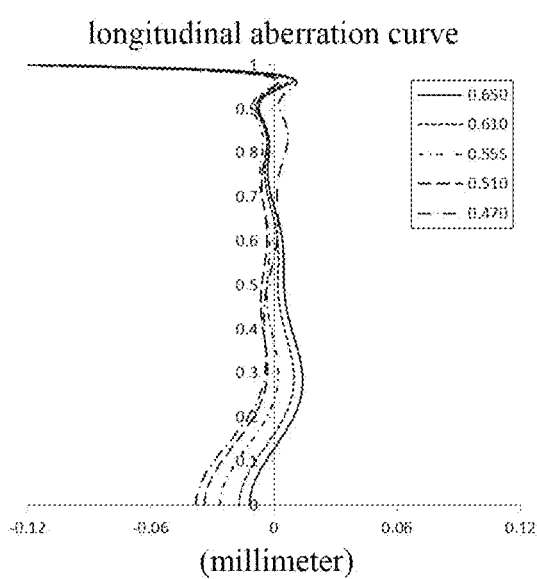
FIGS. 14A to 14D illustrate a longitudinal aberration curve, an astigmatism curve, a distortion curve and a lateral color curve of the optical imaging lens assembly according to embodiment 7, respectively.
Figure 14B:
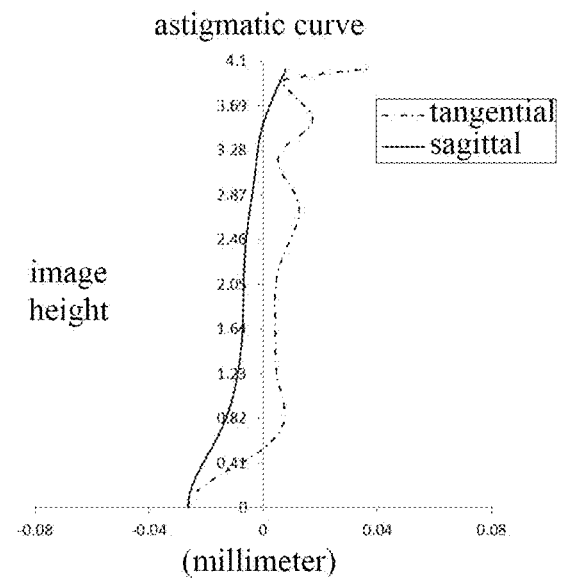
Figure 14C:
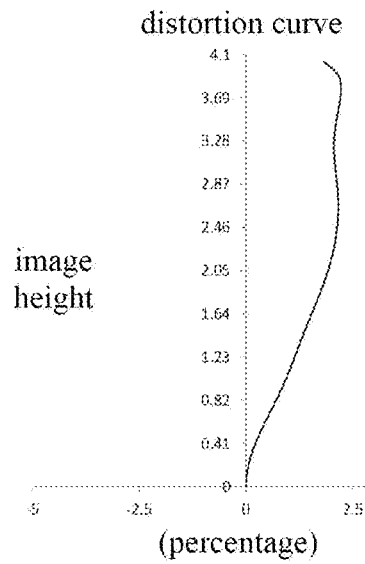
Figure 14D:
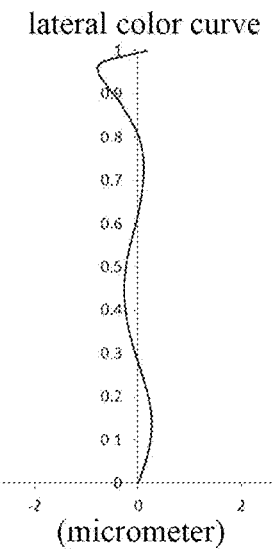

FIG. 14A illustrates a longitudinal aberration curve of the optical imaging lens assembly according to embodiment 7, representing deviations of focal points converged by light of different wavelengths after passing through the optical imaging lens assembly. FIG. 14B illustrates an astigmatism curve of the optical imaging lens assembly according to embodiment 7, representing a curvature of a tangential plane and a curvature of a sagittal plane. FIG. 14C illustrates a distortion curve of the optical imaging lens assembly according to embodiment 7, representing amounts of distortion at different viewing angles. FIG. 14D illustrates a lateral color curve of the optical imaging lens assembly according to embodiment 7, representing deviations of different image heights on an image plane after light passes through the optical imaging lens assembly. It can be seen from FIG. 14A to FIG. 14D that the optical imaging lens assembly provided in embodiment 7 may achieve good image quality.

Embodiment 8

Figure 15:
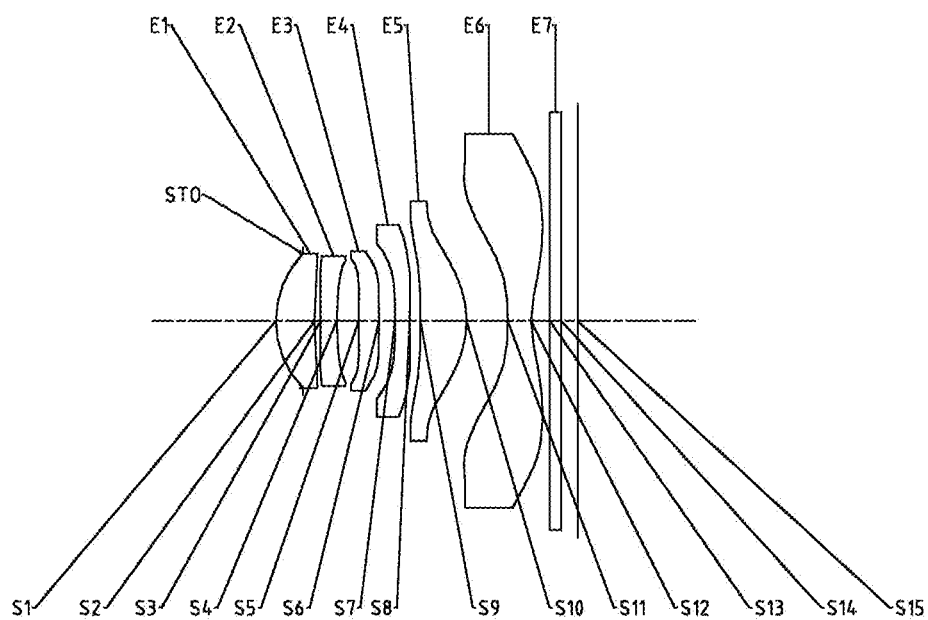
FIG. 15 is a schematic structural view of an optical imaging lens assembly according to embodiment 8 of the present disclosure.

An optical imaging lens assembly according to embodiment 8 of the present disclosure is described below with reference to FIG. 15 to FIG. 16D. FIG. 15 is a schematic structural view of the optical imaging lens assembly according to embodiment 8 of the present disclosure.

As shown in FIG. 15, the optical imaging lens assembly according to an exemplary implementation of the present disclosure includes, sequentially from an object side to an image side along an optical axis, a diaphragm STO, a first lens E1, a second lens E2, a third lens E3, a fourth lens E4, a fifth lens E5, a sixth lens E6, an optical filter E7 and an image plane S15.

The first lens E1 has a positive refractive power, and an object-side surface S1 thereof is a convex surface, and an image-side surface S2 thereof is a concave surface. The second lens E2 has a negative refractive power, and an object-side surface S3 thereof is a convex surface, and an image-side surface S4 thereof is a concave surface. The third lens E3 has a positive refractive power, and an object-side surface S5 thereof is a convex surface, and an image-side surface S6 thereof is a concave surface. The fourth lens E4 has a negative refractive power, and an object-side surface S7 thereof is a convex surface, and an image-side surface S8 thereof is a concave surface. The fifth lens E5 has a positive refractive power, and an object-side surface S9 thereof is a concave surface, and an image-side surface S10 thereof is a convex surface. The sixth lens E6 has a negative refractive power, and an object-side surface S11 thereof is a concave surface, and an image-side surface S12 thereof is a concave surface. The optical filter E7 has an object-side surface S13 and an image-side surface S14. Light from the object sequentially passes through the respective surfaces S1 to S14 and is finally imaged on the image plane S15.

Table 22 shows surface type, radius of curvature, thickness, material and conic coefficient of each lens of the optical imaging lens assembly in embodiment 8, wherein the units for the radius of curvature and the thickness are millimeter (mm).

TABLE 22

| Surface number | Surface type | Radius of curvature | Thickness | Material Refractive index | Material Abbe number | Conic coefficient |
|---|---|---|---|---|---|---|
| OBJ | spherical | infinite | infinite | | | |
| STO | spherical | infinite | −0.5014 | | | |
| S1  | aspheric | 1.8129 | 0.7135 | 1.55 | 56.1 | −9.1201 |
| S2  | aspheric | 8.8484 | 0.1126 | | | 39.8015 |
| S3  | aspheric | 181.2203 | 0.3000 | 1.67 | 20.4 | 99.0000 |
| S4  | aspheric | 6.2716 | 0.4068 | | | −35.9950 |
| S5  | aspheric | 11.2851 | 0.3768 | 1.65 | 23.5 | −99.0000 |
| S6  | aspheric | 64.2314 | 0.2953 | | | 99.0000 |
| S7  | aspheric | 86.8584 | 0.2701 | 1.67 | 20.4 | −99.0000 |
| S8  | aspheric | 7.5967 | 0.2005 | | | −18.1836 |
| S9  | aspheric | −29.6195 | 0.8557 | 1.55 | 56.1 | −88.9819 |
| S10 | aspheric | −1.7887 | 0.7617 | | | −6.8285 |
| S11 | aspheric | −8.7798 | 0.4333 | 1.54 | 55.7 | −1.2180 |
| S12 | aspheric | 1.8731 | 0.3469 | | | −8.4425 |
| S13 | spherical | infinite | 0.2100 | 1.52 | 64.2 | |
| S14 | spherical | infinite | 0.3069 | | | |
| S15 | spherical | infinite | | | | |

As can be seen from Table 22, in embodiment 8, the object-side surface and the image-side surface of any one of the first lens E1 to the sixth lens E6 are aspheric. Table shows high-order coefficients applicable to each aspheric surface in embodiment 8, wherein the surface shape of each aspheric surface may be defined by the formula (1) given in the above embodiment 1.

TABLE 23

| Surface number | A4 | A6 | A8 | A10 | A12 | A14 | A16 | A18 | A20 |
|---|---|---|---|---|---|---|---|---|---|
| S1 | 1.8666E−01 | −1.5382E−01 | 1.2607E−01 | −3.8120E−02 | −4.2320E−02 | 5.7212E−02 | −2.9090E−02 | 6.9540E−03 | −7.1000E−04 |
| S2 | −3.3250E−02 | 1.0325E−02 | 2.8347E−02 | −9.4290E−02 | 1.3635E−01 | −1.0834E−01 | 4.0852E−02 | −3.4300E−03 | −1.1600E−03 |
| S3 | −3.8750E−02 | 7.4019E−02 | −9.5270E−02 | 1.4281E−01 | −1.6913E−01 | 1.3647E−01 | −7.3560E−02 | 2.5231E−02 | −4.0000E−03 |
| S4 | 1.4116E−02 | −1.5040E−02 | 2.4184E−01 | −6.8287E−01 | 1.1060E+00 | −1.1024E+00 | 6.7482E−01 | −2.3669E−01 | 3.8212E−02 |
| S5 | −6.6380E−02 | 7.2122E−01 | −5.0327E−01 | 1.5204E+00 | −2.8196E+00 | 3.1742E+00 | −2.1160E+00 | 7.5679E−01 | −1.0909E−01 |
| S6 | −5.0920E−02 | −1.0216E−01 | 2.3740E−01 | −4.6383E−01 | 6.1656E−01 | −5.6953E−01 | 3.4919E−01 | −1.2642E−01 | 2.0364E−02 |
| S7 | −7.0970E−02 | −1.4122E−01 | 2.3035E−01 | −1.1009E−01 | −1.1274E−01 | 1.9982E−01 | −1.2418E−01 | 3.6538E−02 | −4.2600E−03 |
| S8 | −3.0730E−02 | −1.8632E−01 | 3.1648E−01 | −2.8209E−01 | 1.6389E−01 | −6.3140E−02 | 1.5316E−02 | −2.0900E−03 | 1.2200E−04 |
| S9 | 1.7982E−02 | −1.0111E−01 | 8.4016E−02 | −2.6360E−02 | −6.0000E−04 | 2.7680E−03 | −8.0000E−04 | 9.7800E−05 | −4.6000E−06 |
| S10 | −9.5420E−02 | 6.1681E−02 | −3.9090E−02 | 1.7107E−02 | −3.0900E−03 | 1.4000E−04 | 1.4000E−04 | −1.9000E−05 | 8.6700E−07 |
| S11 | −1.4092E−01 | 7.5751E−02 | −2.6390E−02 | 6.7130E−03 | −1.1700E−03 | 1.3500E−04 | −9.8000E−06 | 4.0200E−07 | −7.2000E−09 |
| S12 | −6.5290E−02 | 2.9715E−02 | −9.3000E−03 | 1.9680E−03 | −2.8000E−04 | 2.7500E−05 | −1.7000E−06 | 6.0800E−08 | −9.6000E−10 |

Table 24 shows effective focal lengths f1 to f6 of each lens, the total effective focal length f of the optical imaging lens assembly, a distance TTL on the optical axis from the center of the object-side surface S1 of the first lens E1 to the image plane S15, and half of the diagonal length ImgH of an effective pixel area on the image plane S15 in embodiment 8.

TABLE 24

| f1 (mm) | 4.03 | f6 (mm) | −2.84 |
|---|---|---|---|
| f2 (mm) | −9.77 | f (mm) | 4.46 |
| f3 (mm) | 21.22 | TTL (mm) | 5.59 |
| f4 (mm) | −12.52 | ImgH (mm) | 4.00 |
| f5 (mm) | 3.45 | | |

Figure 16A:
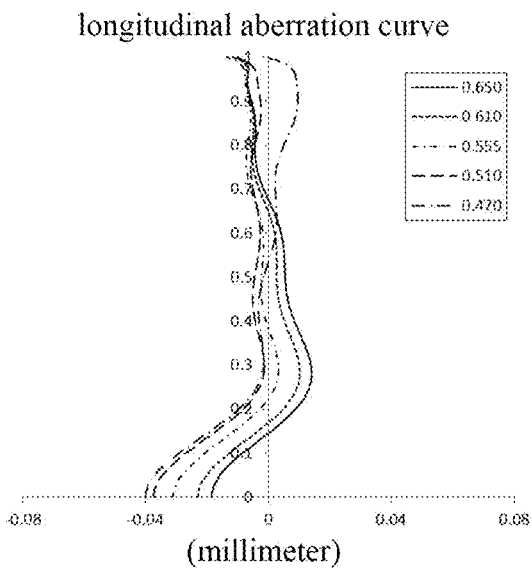
FIGS. 16A to 16D illustrate a longitudinal aberration curve, an astigmatism curve, a distortion curve and a lateral color curve of the optical imaging lens assembly according to embodiment 8, respectively.
Figure 16B:
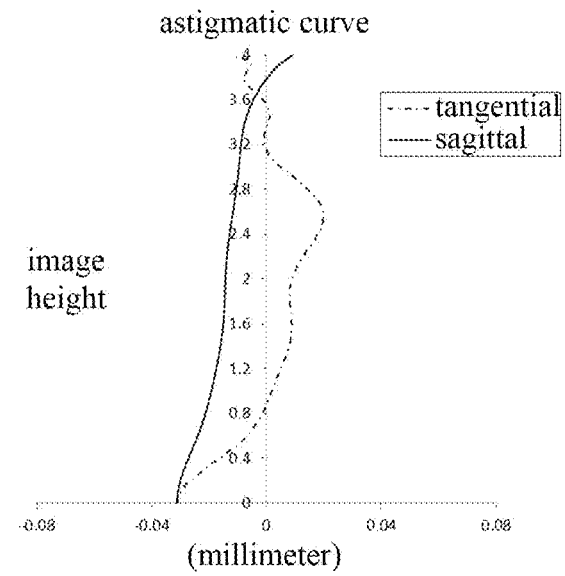
Figure 16C:
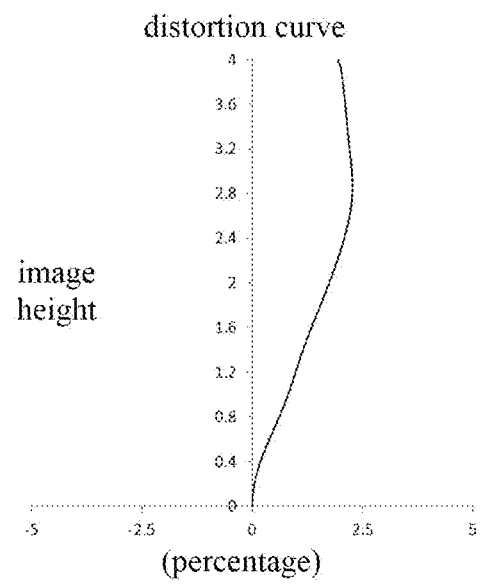
Figure 16D:
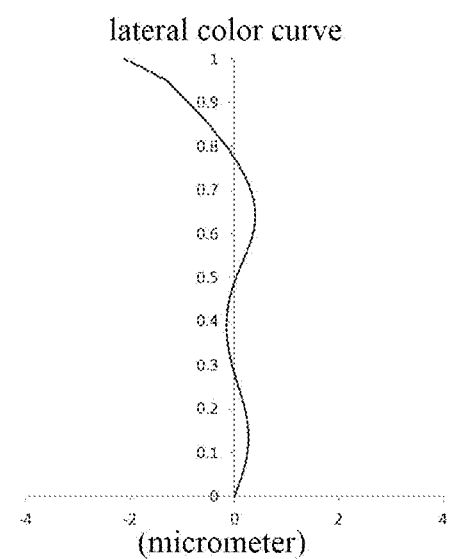

FIG. 16A illustrates a longitudinal aberration curve of the optical imaging lens assembly according to embodiment 8, representing deviations of focal points converged by light of different wavelengths after passing through the optical imaging lens assembly. FIG. 16B illustrates an astigmatism curve of the optical imaging lens assembly according to embodiment 8, representing a curvature of a tangential plane and a curvature of a sagittal plane. FIG. 16C illustrates a distortion curve of the optical imaging lens assembly according to embodiment 8, representing amounts of distortion at different viewing angles. FIG. 16D illustrates a lateral color curve of the optical imaging lens assembly according to embodiment 8, representing deviations of different image heights on an image plane after light passes through the optical imaging lens assembly. It can be seen from FIG. 16A to FIG. 16D that the optical imaging lens assembly provided in embodiment 8 may achieve good image quality.

Based on the above, embodiments 1 to 8 respectively satisfy the relationship shown in Table 25.

TABLE 25

| Formula | Embodiment | | | | | | | |
|---|---|---|---|---|---|---|---|---|
| | 1 | 2 | 3 | 4 | 5 | 6 | 7 | 8 |
| fxtan(HFOV) | 3.81 | 3.82 | 3.81 | 3.81 | 3.81 | 3.94 | 3.92 | 3.88 |
| f5/CT2 | 12.27 | 11.85 | 11.87 | 12.00 | 11.91 | 12.34 | 11.50 | 11.50 |
| f/EPD | 1.65 | 1.73 | 1.73 | 1.73 | 1.71 | 1.75 | 1.76 | 1.80 |
| f2/f | −2.66 | −2.79 | −2.75 | −2.56 | −2.71 | −2.45 | −2.13 | −2.19 |
| f/f5 | 1.46 | 1.49 | 1.48 | 1.50 | 1.51 | 1.48 | 1.31 | 1.29 |
| f1/f6 | −1.56 | −1.56 | −1.56 | −1.53 | −1.61 | −1.57 | −1.39 | −1.42 |
| (R11 − R12)/(R11 + R12) | 1.54 | 1.79 | 1.84 | 1.75 | 1.68 | 1.55 | 1.64 | 1.54 |
| TTL/ImgH | 1.38 | 1.39 | 1.39 | 1.39 | 1.39 | 1.36 | 1.39 | 1.40 |
| R2/R1 | 4.57 | 4.78 | 4.81 | 4.69 | 4.57 | 4.68 | 4.72 | 4.88 |
| T56/T23 | 1.40 | 1.40 | 1.43 | 1.43 | 1.56 | 1.49 | 1.43 | 1.87 |
| f2/R4 | −2.98 | −2.96 | −2.96 | −2.78 | −2.93 | −2.75 | −2.53 | −1.56 |
| CT1/CT2 | 3.09 | 2.95 | 2.94 | 2.95 | 3.01 | 3.04 | 2.49 | 2.38 |

The present disclosure further provides an imaging apparatus, having a photosensitive element which may be a charge-coupled device (CCD) or complementary metal-oxide semiconductor (CMOS). The imaging apparatus may be an independent imaging device such as a digital camera, or may be an imaging module integrated in a mobile electronic device such as a mobile phone. The imaging apparatus is equipped with the imaging lens assembly described above.

The foregoing is only a description of the preferred embodiments of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical imaging lens assembly comprising: a first lens, a second lens, a third lens, a fourth lens, a fifth lens and a sixth lens, which are sequentially arranged from an object side of the optical imaging lens assembly to an image side of the optical imaging lens assembly along an optical axis of the optical imaging lens assembly, wherein,
the first lens has a positive refractive power, and an object-side surface of the first lens is a convex surface and an image-side surface of the first lens is a concave surface;
the second lens has a negative refractive power, and an image-side surface of the second lens is a concave surface;
the third lens has a positive refractive power or a negative refractive power;
the fourth lens has a negative refractive power, and an object-side surface of the fourth lens is a convex surface in a paraxial region thereof;
the fifth lens has a positive refractive power, and an image-side surface of the fifth lens is a convex surface;
the sixth lens has a negative refractive power, and both of an object-side surface and an image-side surface of the sixth lens are concave surfaces;
$11.5 \leq f5/CT2 \leq 12.5$, where f5 is an effective focal length of the fifth lens and CT2 is a center thickness of the second lens on the optical axis;
$3.8 \leq f \times \tan(HFOV) < 5.0$, where f is a total effective focal length of the optical imaging lens assembly and HFOV is half of a maximal field-of-view of the optical imaging lens assembly; and
$4.0 < R2/R1 < 5.0$, where R2 is a radius of curvature of the image-side surface of the first lens and R1 is a radius of curvature of the object-side surface of the first lens.

2. The optical imaging lens assembly according to claim 1, wherein $f/EPD \leq 1.8$,
where EPD is an entrance pupil diameter of the optical imaging lens assembly.

3. The optical imaging lens assembly according to claim 1, wherein $TTL/ImgH \leq 1.4$,
where TTL is a distance on the optical axis from a center of the object-side surface of the first lens to an image plane of the optical imaging lens assembly and ImgH is half of a diagonal length of an effective pixel area on the image plane of the optical imaging lens assembly.

4. The optical imaging lens assembly according to claim 1, wherein $-3.0 < f2/f < -2.0$,
where f2 is an effective focal length of the second lens.

5. The optical imaging lens assembly according to claim 1, wherein $1.1 < f/f5 < 1.6$.

6. The optical imaging lens assembly according to claim 1, wherein $-1.7 < f1/f6 < -1.2$,
where f1 is an effective focal length of the first lens and f6 is an effective focal length of the sixth lens.

7. The optical imaging lens assembly according to claim 1, wherein $1.0 \leq T56/T23 \leq 2.0$,
where T56 is a spaced distance on the optical axis between the fifth lens and the sixth lens and T23 is a spaced distance on the optical axis between the second lens and the third lens.

8. The optical imaging lens assembly according to claim 1, wherein $-3.0 \leq f2/R4 \leq -1.5$,
where f2 is an effective focal length of the second lens and R4 is a radius of curvature of the image-side surface of the second lens.

9. The optical imaging lens assembly according to claim 1, wherein $2.2 < CT1/CT2 < 3.2$,
where CT1 is a center thickness of the first lens on the optical axis.

10. An optical imaging lens assembly comprising: a first lens, a second lens, a third lens, a fourth lens, a fifth lens and a sixth lens, which are sequentially arranged from an object side of the optical imaging lens assembly to an image side of the optical imaging lens assembly along an optical axis of the optical imaging lens assembly,
wherein,
the first lens has a positive refractive power, and an object-side surface of the first lens is a convex surface and an image-side surface of the first lens is a concave surface;
the second lens has a negative refractive power, and an image-side surface of the second lens is a concave surface;
the third lens has a positive refractive power or a negative refractive power;
the fourth lens has a negative refractive power, and an object-side surface of the fourth lens is a convex surface in a paraxial region thereof;
the fifth lens has a positive refractive power, and an image-side surface of the fifth lens is a convex surface;
the sixth lens has a negative refractive power, and both of an object-side surface and an image-side surface of the sixth lens are concave surfaces;
$11.5 \leq f5/CT2 \leq 12.5$, where f5 is an effective focal length of the fifth lens and CT2 is a center thickness of the second lens on the optical axis;
$1.5 < (R11-R12)/(R11+R12) < 2.0$, where R11 is a radius of curvature of the object-side surface of the sixth lens and R12 is a radius of curvature of the image-side surface of the sixth lens;
$3.8 \leq f \times \tan(HFOV) < 5.0$, where f is a total effective focal length of the optical imaging lens assembly and HFOV is half of a maximal field-of-view of the optical imaging lens assembly; and
$4.0 < R2/R1 < 5.0$, where R2 is a radius of curvature of the image-side surface of the first lens and R1 is a radius of curvature of the object-side surface of the first lens.

11. The optical imaging lens assembly according to claim 10, wherein $-1.7 < f1/f6 < -1.2$,
where f1 is an effective focal length of the first lens and f6 is an effective focal length of the sixth lens.

12. The optical imaging lens assembly according to claim 10, wherein $-3.0 < f2/f < -2.0$,
where f2 is an effective focal length of the second lens.

13. The optical imaging lens assembly according to claim 12, wherein $-3.0 \leq f2/R4 \leq -1.5$,
where f2 is the effective focal length of the second lens and R4 is a radius of curvature of the image-side surface of the second lens.

14. The optical imaging lens assembly according to claim 10, wherein $1.1 < f/f5 < 1.6$.

15. The optical imaging lens assembly according to claim 10, wherein $TTL/ImgH \leq 1.4$,
where TTL is a distance on the optical axis from a center of the object-side surface of the first lens to an image plane of the optical imaging lens assembly and ImgH is half of a diagonal length of an effective pixel area on the image plane of the optical imaging lens assembly.

16. The optical imaging lens assembly according to claim 15, wherein $2.2 < CT1/CT2 < 3.2$,
where CT1 is a center thickness of the first lens on the optical axis.

17. The optical imaging lens assembly according to claim 10, wherein $f/EPD \leq 1.8$,
where EPD is an entrance pupil diameter of the optical imaging lens assembly.

* * * * *